United States Patent
Fu et al.

(10) Patent No.: US 11,792,455 B1
(45) Date of Patent: Oct. 17, 2023

(54) AUTOMATIC ON DEMAND BACKUP TO DO-IT-YOURSELF REMOTE MONITORING OF OUTDOOR SECURITY

(71) Applicant: Kuna Systems Corporation, San Bruno, CA (US)

(72) Inventors: Sai-Wai Fu, Los Altos, CA (US); Harold G. Sampson, Sunnyvale, CA (US); Murali Sharma, Walnut Creek, CA (US)

(73) Assignee: KUNA SYSTEMS CORPORATION, San Mateo, CA (US)

( * ) Notice: Subject to any disclaimer, the term of this patent is extended or adjusted under 35 U.S.C. 154(b) by 121 days.

(21) Appl. No.: 17/531,752

(22) Filed: Nov. 21, 2021

Related U.S. Application Data

(63) Continuation-in-part of application No. 17/241,410, filed on Apr. 27, 2021, and a continuation-in-part of application No. 17/203,811, filed on Mar. 17, 2021, now Pat. No. 11,523,485, and a continuation-in-part of application No. 17/106,542, filed on Nov. 30, 2020, now Pat. No. 11,304,274, and a continuation-in-part of application No. 17/026,647, filed on Sep. 21, 2020, now Pat. No. 11,212,886, and a continuation-in-part of application No. 16/792,642, filed on Feb. 17, 2020, now abandoned, and a continuation-in-part of application No. 16/720,379, filed on Dec. 19, 2019, now abandoned.

(51) Int. Cl.
*H04N 21/2387* (2011.01)
*G08B 13/196* (2006.01)

(52) U.S. Cl.
CPC ... *H04N 21/2387* (2013.01); *G08B 13/19669* (2013.01)

(58) Field of Classification Search
CPC ........ G08B 13/19669; G08B 13/19619; G06V 20/52; G06T 2207/30232
See application file for complete search history.

(56) References Cited

U.S. PATENT DOCUMENTS

| | | | |
|---|---|---|---|
| 2002/0177428 A1* | 11/2002 | Menard | G08B 29/24 455/466 |
| 2006/0128357 A1* | 6/2006 | Suryanarayana | H04M 3/42068 455/404.1 |
| 2014/0118140 A1* | 5/2014 | Amis | G08B 25/08 340/539.13 |
| 2014/0136379 A1* | 5/2014 | Smith | G08B 29/00 705/34 |
| 2017/0092109 A1* | 3/2017 | Trundle | G08B 25/006 |
| 2017/0280068 A1* | 9/2017 | Shin | G06V 20/52 |

(Continued)

*Primary Examiner* — Rowina J Cattungal
(74) *Attorney, Agent, or Firm* — Christopher P. Maiorana, PC

(57) ABSTRACT

A system comprising a smart security device and a communication device. The smart security device may be configured to capture pixel data to generate video frames, capture audio, analyze the video frames and the audio, detect an event in response to the analysis, communicate the video frames and the audio and communicate a notification. The communication device may be configured to receive the video frames, the audio and the notification, display the video frames and the notification and playback the audio and override a do not disturb mode of the communication device in response to an emergency.

19 Claims, 14 Drawing Sheets

(56) References Cited

U.S. PATENT DOCUMENTS

| | | | |
|---|---|---|---|
| 2018/0005125 A1* | 1/2018 | Fadell | G05B 15/02 |
| 2018/0033273 A1* | 2/2018 | Siminoff | H04N 5/76 |
| 2018/0115131 A1* | 4/2018 | Kohen | H01R 13/6683 |
| 2019/0188484 A1* | 6/2019 | Lecue | G06N 3/04 |
| 2020/0051412 A1* | 2/2020 | Swiss | G08B 13/19632 |

\* cited by examiner

AUTOMATIC ON DEMAND BACKUP TO DO-IT-YOURSELF REMOTE MONITORING OF OUTDOOR SECURITY

This application relates to U.S. application Ser. No. 17/241,410, filed on Apr. 27, 2021. This application also relates to U.S. application Ser. No. 17/026,647, filed on Sep. 21, 2020. This application also relates to U.S. application Ser. No. 17/203,811, filed on Mar. 17, 2021. This application also relates to U.S. application Ser. No. 17/106,542, filed on Nov. 30, 2020. This application also relates to U.S. application Ser. No. 16/792,642, filed on Feb. 17, 2020. This application also relates to U.S. application Ser. No. 16/720,379, filed on Dec. 19, 2019. Each of the mentioned applications are hereby incorporated by reference in its entirety.

FIELD OF THE INVENTION

The invention relates to security systems generally and, more particularly, to a method and/or apparatus for implementing automatic on demand backup to do-it-yourself remote monitoring of outdoor security.

BACKGROUND

Residential and business property owners have traditionally relied on professional alarm/security services for property protection and crime prevention. Professional security services have high monthly fees. Users often have to enter security codes and risk false alarms. The high fees and continual maintenance are a high burden for customers that mainly want peace of mind, particularly in areas with low crime rates.

With advancing technology in the do-it-yourself (DIY) market, consumers and small businesses often try to avoid paying for professional monitoring of outdoor security cameras. Instead users rely on automatic alerts to inform them about visitors/intruders and then watch live video streams to decide what actions should be taken. A major drawback of the DIY solution is that users will miss any alerts when they are asleep or on vacation without Internet or other data services. Oftentimes, the times when users do not have access to the alerts are the most vulnerable times for properties (i.e., burglaries tend to happen at night or when people are on vacation).

One option is remote monitoring that provides constant monitoring of video by a security officer. These services can be used to enhance onsite security guard services, or can be used to alert keyholders and other responsible parties of problems. These services can be used by contractors that are building on several sites simultaneously, property managers with multiple sites but who do not have a central security office, and other "floaters" who are responsible for covering multiple locations at once. Most wholesale video monitoring services are offered by central station monitoring companies. Monitoring companies already have the infrastructure in place to offer monitoring, and already have relationships with security integrators that sell burglar alarm monitoring services. Security guard companies, who have employees trained to watch banks of security cameras, also offer remote video services. While these solutions can enhance the DIY market by providing monitoring when the property owners are unable, the property owners have the same problem as with professional alarm services. A high monthly cost (i.e., $99 per month) is a cost that many property owners are unwilling to pay. Particularly, since many property owners only need the additional monitoring for a few days at a time or even only for a few hours in day. Conventional monitoring solutions are not an efficient replacement of the DIY solution. The end-user is forced to decide when services are needed, usually for an entire month or longer.

It would be desirable to implement automatic on demand backup to do-it-yourself remote monitoring of outdoor security.

SUMMARY

The invention concerns a system comprising a smart security device and a communication device. The smart security device may be configured to capture pixel data of an area, generate video frames from the pixel data, capture audio of the area, perform an analysis of the video frames and the audio, store the video frames and the audio, detect an event in response to the analysis, communicate the video frames and the audio and communicate a notification. The communication device may implement computer readable instructions. The computer readable instructions may be configured to receive the video frames, the audio and the notification, display the video frames and the notification and playback the audio and override a do not disturb mode of the communication device in response to an emergency.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
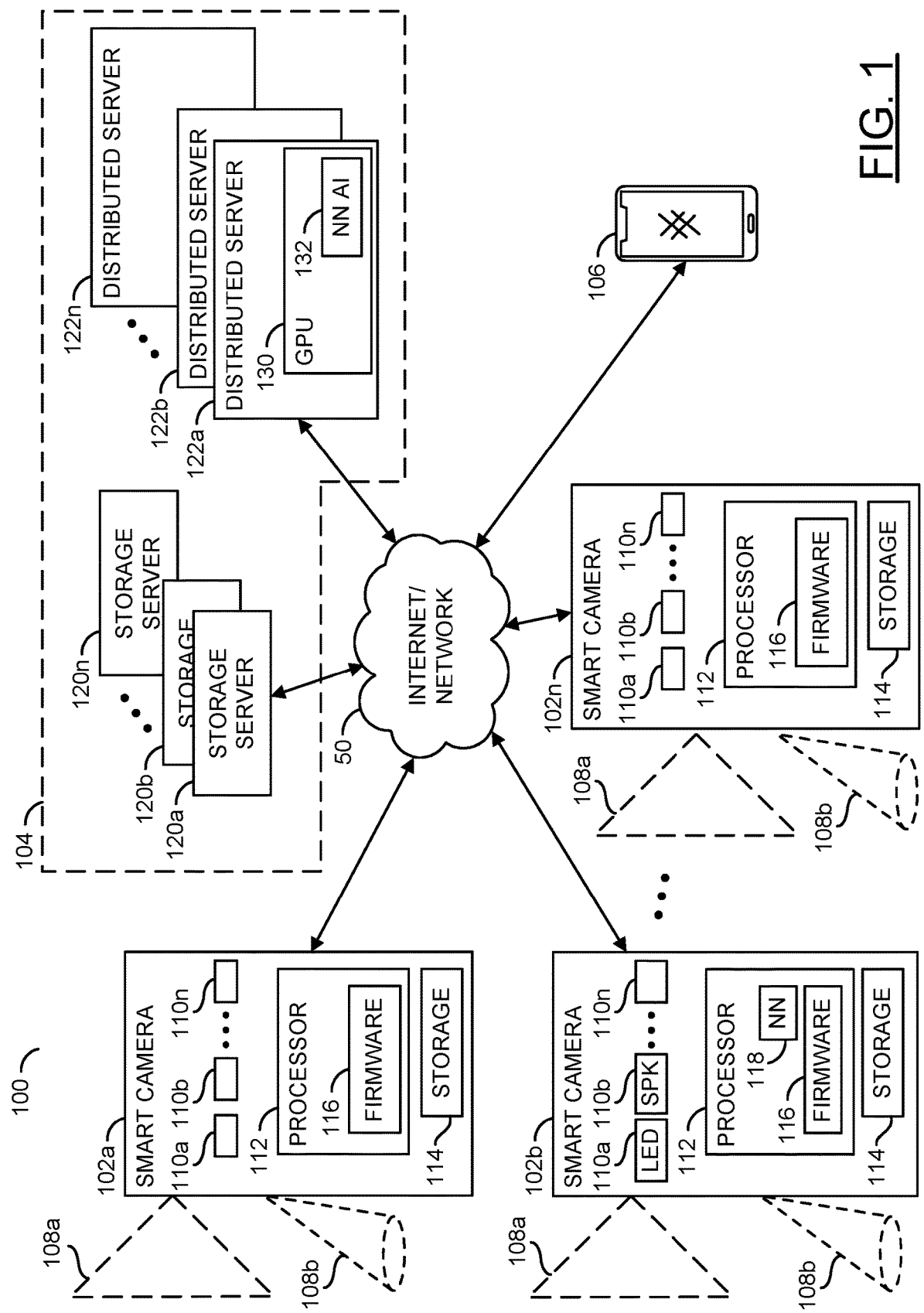
FIG. 1 is a diagram illustrating a system according to an example embodiment of the present invention.

Embodiments of the present invention include providing automatic on demand backup to do-it-yourself remote monitoring of outdoor security that may (i) provide security monitoring for a property, (ii) analyze audio/video to detect events, (iii) notify users of events, (iv) provide automatic emergency alerts during predefined times, (v) automatically contact remote services if a user does not respond to an emergency alert, (vi) enable users to customize when additional fees will be charged for enhanced security services, (vii) enable per-use fees on top of DIY security solutions, (viii) provide an enhanced DIY security solution for residential property and small business owners, (ix) override a do not disturb mode of a user device to provide an emergency alert and/or (x) be implemented as one or more integrated circuits.

Embodiments of the present invention may be configured to implement an automatic on demand backup to Do-It-Yourself (DIY) remote monitoring. In one example, the automatic on demand backup to DIY remote monitoring may be implemented for outdoor security for residential and/or business properties. Implementing the automatic on demand backup DIY remote monitoring may enable property owners to have a property remotely monitored and pay only when particular services are actually used.

The automatic on demand backup DIY may be implemented using a fee structure that may be applied with an automatic trigger. The fee structure may enable users to have access to manual remote monitoring (e.g., using an app to view video streams remotely and receive notifications about events) as a free service and then pay only when particular additional services are actually used (e.g., pay as you go, pay only when needed, etc.). The additional services may be approved by the user to be triggered automatically under particular conditions. Generally, the additional services may be triggered in response to detection of events by computer vision and/or audio analysis during predefined time periods.

In one example, users may specify a particular range of hours of each day to enable the automatic on demand backup. For example, a smartphone app may provide a calendar interface and/or other options that enable several predefined options (e.g., 24/7 automatic on demand backup, automatic on demand backup from midnight to 8 am, no automatic on demand backup, etc.). The fee structure may be configured to charge the user based on a number of hours that the automatic on demand backup period is activated. In another example, users may specify an automatic on demand backup period and the fee structure may be configured to charge the user when there is an emergency event (e.g., an intruder) detected by a smart security device (e.g., an IP-enabled smart camera). For example, the fee structure may provide a per-incident fee. In yet another example, the fee structure may be configured to charge the user when an emergency alert (e.g., sent via a phone call, via an emergency alert sent to a smartphone, via an emergency alert sent via a smart home assistant, sent via a home siren, etc.) is not responded to within a predefined amount of time. For example, the user may have a preset time of one minute to respond to an alert. After the preset time expires, the automatic on demand backup service may be provided by remote live monitoring personnel (e.g., to watch the live video of the intrusion and make a decision to dispatch authorities such as 911 or other services). For example, the fee structure may provide a charge when the remote live monitoring personnel is contacted.

The automatic on demand backup may be initiated with a phone call and/or an alert to a designated device (e.g., a smartphone, a tablet computing device, a smart home assistant, etc.). The designated device may be configured to enable the emergency alert to bypass any type of Do Not Disturb (e.g., DnD) setting. The emergency alert may provide a loud alarm in order to wake up a person for the emergency and/or ensure the person becomes aware of the emergency. The automatic on demand backup service may be invoiced using the fee structure on a short term basis (e.g., less than one week, on a per incidence basis, both, etc.). For example, users are more likely to use the additional features provided by the automatic on demand backup service that is provided using a micro-charge (e.g., $3 per day or per incidence) instead of paying a flat monthly fee (e.g., emergency scenarios are likely to be rare occurrences). In some embodiments, the fee structure for the automatic on demand backup service may comprise a low flat-rate fee to enable the automatic on demand backup service and an additional charge when the remote live monitoring personnel have to step in (e.g., when the user does not respond to the emergency alert).

In embodiments where a per incidence fee structure is implemented, the automatic on demand backup service may comprise a video verification of an incident by a live person. The video of the event that was determined to be an emergency may be manually viewed by a person to ensure that the emergency was not a false positive (e.g., to prevent an improper charge being applied to the fee structure). The smart home security device (e.g., smart camera) may be configured for a particular environment by the homeowner to further prevent false positive incidents.

Embodiments of the present invention may comprise one or more smart security devices (e.g., smart cameras) implemented at a property. The smart security devices may be configured to capture pixel data and/or audio, generate video frames from the pixel data and perform an analysis of the video frames and/or the audio. The smart security devices may be configured to generate notifications in response to the analysis of the video and/or audio. The notifications and/or video/audio streams may be communicated to a user/communication device (e.g., a smartphone, a beeper, a smart home assistant, etc.) to enable manual (e.g., DIY) remote monitoring by the user.

The additional features for the automatic on demand backup may be enabled during the predefined automatic on demand backup period. The smart security device may analyze the video/audio during the automatic on demand backup period to detect emergency events (e.g., intruders, damage to property, loiterers, other suspicious activity, etc.). For example, the automatic on demand backup period may be set for times when the property owner is on vacation, off-the-grid, sleeping, at work, etc. In response to detecting the emergency event during the automatic on demand backup period, the notification sent to the user device may be an emergency alert.

The emergency alert may comprise a loud wake-up call to the designated user (e.g., the designated user may pre-configure permission for the emergency alert to bypass a DnD mode of the smartphone). In one example, the emergency alert may comprise a phone call to a cell phone number provided by the designated user. The designated user may test to make sure the emergency alert is loud enough and properly bypasses the DnD mode of the smartphone. In another example, the emergency alert may comprise a loud alert sound generated by the smartphone. Similarly, the designated user may test to make sure the emergency alert is loud enough and properly bypasses the DnD mode for the particular app that generates the loud alert sound. In yet another example, the emergency alert may be implemented by a device other than a smartphone (e.g., a smart home assistant implementing a conversational application, such as an Alexa Skill). If the designated user does not respond to the emergency alert for longer than the predefined amount of time (e.g., 1 minute, 2 minutes, 5 minutes, etc.), the remote live monitoring service may step in and view the live video to confirm that the emergency alert is not a false positive and determine whether to dispatch emergency services. If the designated user responds within the predefined amount of time to dismiss the emergency alert, then the remote live monitoring services may not step in (e.g., a charge may be avoided).

Referring to FIG. 1, a diagram illustrating a system according to an embodiment of the present invention is shown. The system 100 is shown. The system 100 may implement security light cameras with cloud-based video management. The system 100 may be configured to implement an automatic on demand backup period for DIY home security. The automatic on demand backup period for DIY home security may enhance manual monitoring of video streamed by the system 100 with additional features that may be performed during a predefined period. By limiting the usage of the additional features to the predefined period, a fee structure may be implemented that may enable users to access the additional features on demand.

The system 100 may comprise a network 50, blocks (or circuits) 102a-102n, a block (or circuit) 104 and/or a block (or circuit) 106. The network 50 may be a local network and/or a wide area network. For example, the network 50 may be the internet. The circuits 102a-102n may implement smart camera lights and/or smart camera lights. The circuit 104 may implement a cloud computing service (e.g., a cluster of server computers). The circuit 106 may implement a user device (e.g., a communication device). The number, type and/or arrangement of the components of the system 100 may be varied according to the design criteria of a particular implementation.

The smart camera lights 102a-102n may be configured to capture video data, capture audio data and/or generate light. A dotted shape 108a and a dotted shape 108b are shown extending from each of the smart camera lights 102a-102n. The dotted shape 108a may represent a light emitted by the smart camera lights 102a-102n. The light 108b may comprise a spotlight (e.g., light directed and/or focused at a particular location and/or object), general illumination (e.g., lighting for visibility and/or decorative effect) and/or colored lighting (e.g., flashing red and blue lights that provide a deterrent effect). The light 108b may be emitted, turned on/off, dimmed/brightened and/or strobed. In an example, the light 108b may comprise a combination of three lights (e.g., a white light at 10,000 Lumen, a red light at 1,000 Lumen and a blue light at 1,000 Lumen).

The dotted shape 108a may represent one field of view (e.g., a boundary, a range, etc.) captured by a capture device (e.g., a camera) implemented by each of the smart camera lights 102a-102n. The video data may comprise pixel data, video frames arranged from the pixel data and/or images of the field of view 108a. In the example shown, each of the smart camera lights 102a-102n may have one field of view 108a. However, one or more of the smart camera lights 102a-102n may capture more than one field of view (e.g., implement dual cameras, implement a multi-camera system, etc.).

Each of the smart camera lights 102a-102n are shown comprising blocks (or circuits) 110a-110n, a block (or circuit) 112 and/or a block (or circuit) 114. The circuits 110a-110n may implement various components of the smart camera lights 102a-102n that enable functionality and/or features of the smart camera lights 102a-102n. In one example, one or more of the components 110a-110n of the smart camera lights 102a-102n may comprise a lighting element. The circuit 112 may implement a processor. The smart camera lights 102a-102n may comprise other components (not shown). In some embodiments each of the smart camera lights 102a-102n may have differing capabilities and/or features. The circuit 114 may implement storage. The number, type and/or arrangement of the components of the smart camera lights 102a-102n. Details of the smart camera lights 102a-102n may be described in association with FIGS. 4-5.

The components 110a-110n may be configured to monitor and/or sense the environment (e.g., an area) near the smart camera lights 102a-102n. For example, one or more of the components 110a-110n may be sensors. In an example, one of the components 110a-110n may be an image sensor configured to capture video frames. One or more of the components 110a-110n may be configured store and/or communicate data. In one example, one or more of the components 110a-110n may be a memory. In another example, one or more of the components 110a-110n may be a communication device configured to upload information to the internet 50.

The processor 112 may be configured to read information from the components 110a-110n, write information to the components 110a-110n, store and/or retrieve data to/from the storage 114 and/or execute computer readable instructions. In one example, the processor 112 may be a video processor (e.g., a processor configured to execute computer readable instructions and comprising dedicated hardware for processing video data). The processor 112 may be configured to perform video processing operations to generate video frames. The processor 112 may be configured to select still images from the video frames to upload to the distributed servers 122a-122n. The processing capability of processor 112 may be limited due to size constraints, power constraints, cost constraints, etc.

The storage 114 may comprise a removable storage. In an example, the removable storage 114 may be implemented as an SD card. The removable storage 114 may be configured to store video frames locally on the smart camera lights 102a-102n. For example, the removable storage 114 may implement a 1 TB capacity storage medium that may store approximately ninety days of HD video 24×7. The format and/or capacity of the removable storage 114 may be varied according to the design criteria of a particular implementation.

The processor 112 may comprise a block (or circuit) 116. The block 116 may be a firmware for the processor 112. The firmware 116 may configure how the processor 112 interacts with the components 110a-110n and/or the input/output generated by the processor 112. The smart camera lights 102a-102n may operate based on the firmware 116. Updating the firmware 116 may alter functionality and/or features performed by the smart camera lights 102a-102n. In some embodiments, the smart camera lights 102a-102n may be updated to operate with the system 100 by updating the firmware 116.

One or more of the smart camera lights 102a-102n may comprise a block (or circuit) 118. In the example shown, only the smart camera 102b is shown comprising the block 118. The block 118 may be a module of the processor 112. The module 118 may be a neural network. For example, the processor 112 may implement a neural network artificial intelligence. The may be configured to detect objects in the video frames generated by the processor 112.

The processor 112 may be configured to detect one or more triggering events. The triggering events may occur when a particular input is determined to be above some predetermined threshold value. The processor 112 may analyze input detected by one or more of the components 110a-110n to determine whether the detected input is above the predetermined threshold. In one example, if one of the components 110a-110n is a passive infrared (PIR) sensor configured to detect motion, then the triggering event may be when the processor 112 determines that the input from the PIR sensor is above a threshold for motion. In another example, if one of the components 110a-110n is a microphone, then the triggering event may be when the processor 112 determines that the incoming audio is above a particular audio level and/or matches a particular frequency pattern.

In some embodiments, the triggering event may occur in response to an output of the processor 112. For example, the processor 112 may be configured to analyze video frames generated by the processor 112. In one example, the processor 112 may be configured to analyze the video frames for a particular amount of motion and/or a change in the amount of light to detect a triggering event (e.g., an amount of motion above a threshold amount of motion). In another example, the processor 112 may use the neural network artificial intelligence module 118 to determine whether the video frame has captured a particular type of object (e.g., a person, an animal, a vehicle, a package, etc.) to detect the triggering event. The type of input and/or the threshold for the triggering event may be varied according to the design criteria of a particular implementation.

In some embodiments, the neural network artificial intelligence 118 may be configured to determine when a triggering event is an emergency event. The emergency event may be a detection that may be determined to warrant immediate attention. In an example, the emergency event may comprise the detection of an intruder (e.g., a burglar), property damage (e.g., a broken pipe, a fire, a fallen tree, etc.), a loiterer (e.g., a suspicious person, a package thief, etc.), etc. The emergency events may be used to trigger the alerts for the automatic on demand backups. The type of triggering event determined to be an emergency event may be customized by the user and/or varied according to the design criteria of a particular implementation.

The cloud computing service 104 may comprise a number of blocks (or circuits) 120a-120n and/or a number of blocks (or circuits) 122a-122n. The circuits 120a-120n may each implement a storage server. The circuits 122a-122n may each implement a distributed server. The cloud computing service 104 may comprise other components (not shown). The number, type and/or arrangement of the components of the cloud computing service 104 may be varied according to the design criteria of a particular implementation.

The storage servers 120a-120n may be configured to provide storage resources. The storage servers 120a-120n may be implemented as a remote server computer. The storage servers 120a-120n may be provided as a service. The storage servers 120a-120n may not be dedicated to the system 100 (e.g., multiple end-users may access the storage resources of the storage servers 120a-120n). For example, the storage servers 120a-120n may comprise multiple, redundant storage media (e.g., hard disk drives, solid state drives, etc.) to enable multiple end-users to access data stored across the storage servers 120a-120n. Access to the storage resources of the storage servers 120a-120n may be fee-based (e.g., based on an amount of total storage resources used). For example, the removable storage 114 may store recent video data locally, while the storage servers 120a-120n may be configured to store large amounts of data long-term.

The storage servers 120a-120n may comprise a hierarchy of data storage. One tier of storage may be archival storage (e.g., glacial storage). Archival storage may be suited to data that may be accessed infrequently and/or data that may not be needed urgently. The storage servers 120a-120n may enable data to be retrieved from archival storage but may implement a waiting period (e.g., content may be available after waiting a day). Another tier of storage may be on-demand retrieval. On-demand storage may enable fast access to data (e.g., content may be available instantly or after a shorter amount of time than archival storage, such as a one hour wait). On-demand storage may have greater costs associated in terms of bandwidth costs and storage costs. In an example, archival storage may be on the order of 1000 times less expensive than on-demand storage. However, archival storage may not be suitable for real-time video access by end-users and/or providing notifications of events detected.

The distributed servers 122a-122n may be configured to provide computational resources. The distributed servers 122a-122n may be provided as a service. The distributed servers 122a-122n may not be dedicated to the system 100 (e.g., multiple end-users may access the computational resources of the distributed servers 122a-122n). The distributed servers 122a-122n may provide tiered services to enable access to the computational resources. Access to the computational resources of the distributed servers 122a-122n may be fee-based (e.g., based on an amount of computational resources used at one time, based on how long the computational resources are used, based on a percentage usage of the computational resources, etc.). For example, when an end-user accesses more of the computational resources of the distributed servers 122a-122n, then more fees may be charged. Generally, the system 100 may keep fees lower by restraining usage of the computational resources of the distributed servers 122a-122n (e.g., providing selected video frames and/or providing a low bitrate version of video frames instead of a full high bitrate video stream). For example, the computational resources of the distributed servers 122a-122n may use less computational resources and/or time when operating on low bitrate video streams compared to high bitrate video streams (e.g., less video data to operate on results in less computational resources used).

The distributed servers 122a-122n may each comprise a block (or circuit) 130. The circuit 130 may be a graphics processing unit (e.g., a video card). The graphics processing unit 130 may comprise a block (or circuit or module) 132. The module 132 may be a neural network artificial intelligence module. For example, the graphics processing unit 130 may be customized to perform neural network operations of the neural network artificial intelligence module (e.g., a dedicated neural network card). The distributed servers 122a-122n may comprise other components (such as a CPU, RAM, storage, etc., not shown). The number, type and/or arrangement of the components of the distributed servers 122a-122n may be varied according to the design criteria of a particular implementation.

The neural network artificial intelligence module 132 may be configured to perform a detection. In an example, the smart camera lights 102a-102n may perform an initial detection to detect the triggering event. The neural network artificial intelligence module 132 may perform a second (e.g., additional) detection. The neural network artificial intelligence module 132 may be configured to perform advanced image analysis (e.g., object detection, object classification, facial recognition, computer vision, etc.) corresponding to the triggering event. In an example, the advanced image analysis may be configured to not only detect that a person is in the video frame but also that the person is a mail carrier (e.g., wearing a uniform, carrying a package, etc.). In another example, the advanced image analysis may be configured to not only detect that a vehicle is in the video frame but also detect the make and model of the vehicle. The advanced image analysis performed by the neural network artificial intelligence module 132 may use more computing resources than the computing resources used by the smart camera lights 102a-102n to detect the triggering event. In an example, the advanced image analysis may use more computing resources than the processor 112 for analyzing the video frames for a particular amount of motion and/or a change in the amount of light to detect the triggering event (e.g., an amount of motion above a threshold amount of motion) and/or reading the input detected by the sensors 110a-110n.

The neural network artificial intelligence module 132 may be more effective (e.g., accurate) at detecting objects and/or recognizing characteristics of objects in video frames than the simple neural network artificial intelligence module 118 that may be implemented by one or more of the smart camera lights 102a-102n. For example, the smart camera lights 102a-102n may not implement the dedicated GPU 130. The neural network artificial intelligence module 132 may consume more power and/or more processing resources than the simple neural network module 118 of the smart camera lights 102a-102n. For example, the simple neural network module 118 may be a modified and/or compressed version of the neural network module 132. The compressed simple neural network module 118 may have a reduced size and/or complexity to enable execution on the processor 112. The compressed simple neural network module 118 may use less computing resources than the neural network module 132. However, the reduced size and/or complexity of the simple neural network module 118 may result in less predictive power and/or accuracy than using the neural network module 118. In some embodiments, the simple neural network 118 and the neural network artificial intelligence module 132 may comprise overlapping (or redundant capabilities). For example, the smart camera lights 102a-102n may be capable of performing some (or all) of the functionality of the distributed servers 122a-122n locally (e.g., as an edge device, without uploading video data to the cloud computing service 104).

The distributed servers 122a-122n may be configured to provide packages of tools that may be suitable for internet-of-things (IoT) devices such as the smart camera lights 102a-102n. The tools offered by the distributed servers 122a-122n may be useful to end-users of the smart camera lights 102a-102n, but may comprise a cost to the vendors of the smart camera lights 102a-102n. Access to the GPU 130 of the distributed servers 122a-122n may be more expensive for high bitrate video (e.g., more of the distributed servers 122a-122n may be needed to process high bitrate video and/or more time may be reserved from the distributed servers 122a-122n in order to process the high bitrate video).

Generally, storage resources provided by the storage servers 120a-120n are less expensive than the computing resources provided by the distributed servers 122a-122n. For example, the video data generated by the smart camera lights 102a-102n may be stored by the storage servers 120a-120n at a less expensive fee than using the neural network artificial intelligence module 132 to analyze the same amount of video data with the distributed servers 122a-122n. The system 100 may be less restrictive with storing video data in the storage servers 120a-120n than with processing the video data in the distributed servers 122a-122n.

The distributed servers 122a-122n and/or the storage servers 120a-120n may be configured to store data, retrieve and transmit stored data, process data and/or communicate with other devices (e.g., the user device 106). The distributed servers 122a-122n and/or the storage servers 120a-120n may be implemented as part of a cloud computing platform (e.g., distributed computing). In an example, the distributed servers 122a-122n and/or the storage servers 120a-120n may be implemented as a group of cloud-based, scalable server computers. By implementing a number of scalable servers, additional resources (e.g., power, processing capability, memory, etc.) may be available to process and/or store variable amounts of data. For example, the distributed servers 122a-122n and/or the storage servers 120a-120n may be configured to scale (e.g., provision resources) based on demand. The distributed servers 122a-122n and/or the storage servers 120a-120n may implement scalable computing (e.g., cloud computing). The scalable computing may be available as a service to allow access to processing and/or storage resources without having to build infrastructure (e.g., the provider of the system 100 may not have to build the infrastructure of the distributed servers 122a-122n and/or the storage servers 120a-120n). In some embodiments, a same cloud-services provider may provide both the distributed servers 122a-122n and/or the storage servers 120a-120n.

The user device 106 may be configured to enable a user (e.g., a homeowner) to interact with the system 100. For example, the circuit 106 may have a wired and/or wireless connection to the network 50 and/or the smart camera lights 102a-102n. In some embodiments, the user device 106 may be separated from the smart camera lights 102a-102n by long distances (e.g., miles). In the example shown, the user device 106 may be a smartphone (e.g., a handheld or portable user device). In some embodiments, the user device 106 may be implemented as a desktop computer, a laptop computer, a smart watch, a tablet computing device, etc. Generally, the user device 106 may be a device configured to communicate wirelessly, display video content and/or receive/transmit audio. The type of device implemented as the user device 106 may be varied according to the design criteria of a particular implementation.

The smart camera lights 102a-102n and/or the cloud computing service 104 may be configured to wirelessly communicate the video data (e.g., one or more video streams) to the user device 106. In an example, the processor 112 and/or the distributed servers 122a-122n may be configured to format the video streams to be communicated and/or establish a wireless communication link between the smart camera lights 102a-102n, the cloud computing service 104 and the user device 106 (e.g., using Wi-Fi, cellular communication such as 3G/4G/LTE/5G, Bluetooth, etc.). Video streams and/or other data may be transmitted between the smart camera lights 102a-102n, the cloud computing service 104 and the user device 106 (e.g., instructions and/or commands may be sent from the smartphone 106 to one or more of the smart camera lights 102a-102n and/or the cloud computing service 104, audio for implementing a two-way intercom may be transmitted, information about objects detected by video analysis performed by the distributed servers 122a-122n may be transmitted to the smartphone 106, etc.). The type of information communicated, and/or the wireless communication protocol(s) implemented may be varied according to the design criteria of a particular implementation.

The smart camera lights 102a-102n may be configured to detect triggering events in real-time. The triggering events may be detected based on thresholds that are less computationally intensive than the object detection performed by the neural network artificial intelligence module 132. When the processor 112 detects one or more triggering events, the processor 112 may generate a control signal. The control signal may be configured to control the various components 110a-110n. In one example, the light 108b may be generated in response to the triggering events.

In some embodiments, the processor 112 may generate and/or apply metadata to the video frames that correspond to the triggering events (e.g., objects detected). For example, in response to detecting a person, metadata may be added to the video frames that indicate a person has been detected. The metadata may further comprise characteristics of objects detected. For example, characteristics of the person detected may comprise a hair color, a height, color of clothing worn, an amount of time that the person loitered in the area, etc. The type of metadata added by the processor 112 to the video frames may be varied according to the design criteria of a particular implementation.

The video frames and/or the metadata generated and/or applied to the video frames by the processor 112 may be uploaded to the cloud computing service 104. The cloud computing service 104 may enable the end users to access the stored video frames using the user device 106. The storage servers 120a-120n may store the video frames and/or metadata. The distributed servers 122a-122n may be configured to perform various operations (e.g., modifications such as encoding, transcoding, cutting, cropping, etc.) on the stored video frames. In some embodiments, the neural network AI 132 may be configured to perform various computer vision operations (e.g., object detection, characteristic detection, facial recognition, etc.). The various operations performed by the cloud computing service 104 may have a monetary cost that may depend on the amount of time spent performing the operations and/or the hardware resources applied to perform the operations.

The distributed servers 122a-122n may be configured to process the still images using the neural network AI modules 132. The distributed servers 122a-122n may generate a response based on the results of analyzing the still images using the neural network AI modules 132. In one example, if the neural network AI modules 132 do not detect an object, the distributed servers 122a-122n may generate a response that notifies the smart camera lights 102a-102n to not upload the video data to the storage servers 120a-120n. In another example, if the neural network AI modules 132 do not detect an object, the distributed servers 122a-122n may determine why the triggering event detected by the smart camera lights 102a-102n resulted in a false positive and generate a response that provides feedback to the smart camera lights 102a-102n to help prevent future false positives. In yet another example, if the neural network AI modules 132 does detect an object, the distributed servers 122a-122n may generate a response that instructs the smart camera lights 102a-102n to upload the video data that corresponds to time of the detected object to the storage servers 120a-120n. In still another example, if the neural network AI modules 132 does detect an object, the distributed servers 122a-122n may generate a response that notifies the smart camera lights 102a-102n that the object was detected and the smart camera lights 102a-102n may send a real-time notification to the user device 106 with information about the detected object. The response of the distributed servers 122a-122n and/or the smart camera lights 102a-102n to the detected object may be varied according to the design criteria of a particular implementation.

Various types of input detected by the smart camera lights 102a-102n may be determined to be one of the triggering events. For example, the triggering events may be any type of event determined to be relevant (e.g., motion detected, a button pressed, a time schedule, data from an external sensor, etc.). For example, the system 100 may combine multiple modalities of detection on the smart camera lights 102a-102n (e.g., using a combination of any, some, or all of vision, passive IR motion, sound, touch sensors, etc. to decide when to trigger) to determine information that may be used for metadata.

The smart camera lights 102a-102n may not necessarily implement the simplified neural network AI modules 118. One, or more, or none of the smart camera lights 102a-102n may implement the simplified neural network AI modules 118. Generally, the smart camera lights 102a-102n may be less capable of detecting objects (e.g., relatively dumb) compared to the distributed servers 122a-122n. However, the smart camera lights 102a-102n may be capable (e.g., smart enough) to filter down the set of events for the distributed servers 122a-122n to process.

The smart camera lights 102a-102n may be configured to upload data (e.g., the captured video data, still images, audio, etc.) to the distributed servers 122a-122n and/or the storage servers 120a-120n. For example, the data uploaded to the storage servers 120a-120n may be streamed to the user device 106. The user device 106 may connect to the storage servers 120a-120n to allow the user to request the stored video data. For example, the video data may be sent to the user device 106 as a live (or nearly live) video stream. The data traffic to/from the smart camera lights 102a-102n, the distributed servers 122a-122n, the user device 106 and/or the storage servers 120a-120n may be encrypted (e.g., AES 128-bit encryption, AES 256-bit encryption, etc.). User account passwords may be salted and hashed with a cryptographic hash function.

The functionality of the system 100 may be configured to leverage the hardware of the smart camera lights 102a-102n and the processing capabilities of the distributed servers 122a-122n. For example, the hardware of the smart camera lights 102a-102n may be capable of implementing the functionality for detecting the triggering event (e.g., detecting motion, recording video data, analyzing audio, etc.). In some embodiments, the system 100 may be enabled by performing a firmware update of the smart camera lights 102a-102n. The firmware update may provide updated computer readable instructions for the processor 112 to enable selecting images from the video data and communicating the selected images to the distributed servers 122a-122n (e.g., instead of uploading the full video stream). Details of the system 100 may be described in association with U.S. application Ser. No. 16/540,309, filed on Aug. 14, 2019, appropriate portions of which are incorporated by reference.

In some embodiments, the smart camera lights 102a-102n may appear similar to a standard outdoor light (e.g., a porch light, a flood light, etc.). The smart camera lights 102a-102n may be configured as edge devices for the system 100. In an example, the smart camera lights 102a-102n may be configured to perform edge processing and/or provide edge (e.g., local) storage using the removable storage 114. The edge storage 104 may enable storage of high bitrate video, without communicating a large amount of video data to the cloud computing service 104. For example, the edge storage 104 may provide 24/7 storage for the highest quality video. Storing high bitrate video locally may enable forensic analysis of the video by the end users. In an example, the local storage 114 may be implemented as a SD card, a portable solid state drive a portable hard drive, a flash drive, etc. The local storage 114 may enable video data to be stored locally on the smart camera security lights 102a-102n. Storing data locally may enable 24/7 video recordings to be stored without incurring costs (e.g., bandwidth costs and/or storage costs associated with the storage servers 120a-120n). The smart security camera lights 102a-102n may be configured to upload low bitrate video to the cloud computing service 104 instead of the high bitrate video. The indexing and/or metadata generated by the processor 112 may enable the common video content between the high bitrate video and the low bitrate video to be synchronized.

Figure 2:
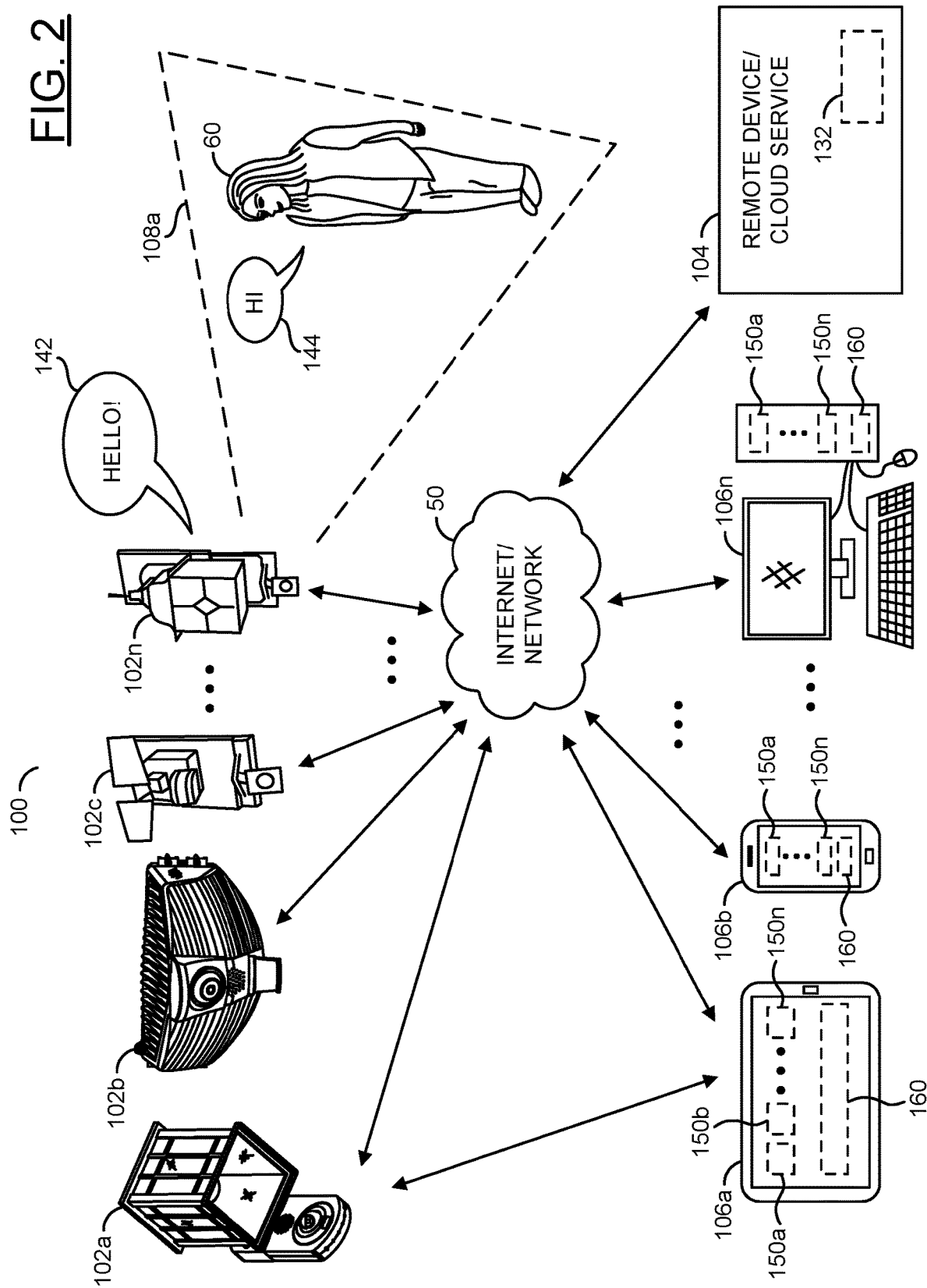
FIG. 2 is a diagram illustrating a system configured to implement mobile distributed security.

Referring to FIG. 2, a diagram illustrating a system configured to implement mobile distributed security is shown. An alternate embodiment of the system 100 is shown. The system 100 may comprise the network 50, a visitor 60, the smart security camera lights 102a-102n, the cloud computing service 104 and a number of the user devices 106a-106n. The visitor 60 may be a visitor to a premises, a property owner, an employee, a loiterer, a burglar, a delivery person, etc. In the system 100, the smart security camera lights 102a-102n may implement an outdoor hub for outdoor internet-of-things (IoT) devices.

In the example shown, the smart device 102a may be a smart security light implemented as an exterior porch light (e.g., a camera integrated with a light implemented as a single unit as described in association with U.S. application Ser. No. 15/611,975, filed on Jun. 2, 2017, now U.S. Pat. No. 10,117,309, appropriate portions of which are incorporated by reference). In the example shown, the smart device 102b may be a smart security floodlight (e.g., a camera integrated as a single unit with a floodlight, a high intensity spotlight, flashing colored lights and/or speakers as described in association with U.S. application Ser. No. 16/850,944, filed on Apr. 16, 2020 and U.S. application Ser. No. 17/241,410, filed on Apr. 27, 2021, appropriate portions of which are incorporated by reference). In the example shown, the smart devices 102c and 102n may implement an exterior light attached to a wall plate (e.g., a standalone outdoor light fixture attached to a wall plate with a camera and the components 110a-110n, the processor 112, etc.). The wall plate embodiment of the smart devices 102c and 102n may enable an end user to add functionality of the components 110a-110n and the processor 112 to any light fixture. For example, the wall plate embodiment may be compatible with any standard outdoor light fixture available at common hardware stores. Details of the wall plate camera may be described in association with U.S. application Ser. No. 16/585,342, filed on Sep. 27, 2019 and U.S. application Ser. No. 17/026,647, filed on Sep. 21, 2020, appropriate portions of which are incorporated by reference. In some embodiments, the smart devices 102a-102n may implement a smart security doorbell. The smart devices 102a-102n may be implemented at a single location (e.g., at one property) and/or at multiple locations (e.g., at multiple properties such as security for a neighborhood). The types and/or styles of smart security devices 102a-102n may be varied according to the design criteria of a particular implementation.

The smart security devices 102a-102n may each comprise the various sensors and/or actuators 110a-110n. The smart devices 102a-102n may be configured to read sensor data from the sensors 110a-110n to make inferences about the environment. In one example, one of the sensors 110a-110n implemented by the smart devices 102a-102n may be a camera sensor.

Camera sensors implemented by the smart devices 102a-102n may be configured to enable video frames to be generated (e.g., convert light input to raw pixel data that may be used by a processor to generate video frames). The processor 112 implemented by each of the smart devices 102a-102n may be configured to perform video analysis (e.g., object detection, behavior detection, facial recognition, object classification, conduct inferences against a machine learning model, etc.). The smart devices 102a-102n may each implement a wireless module. The wireless modules may enable the smart devices 102a-102n to communicate wirelessly (e.g., using Wi-Fi, ZigBee, Bluetooth, LTE, etc.) via the internet 50 and/or a local connection. In the example shown, the smart device 102a may communicate directly with the user device 106a (e.g., a device-to-device connection, such as Bluetooth). The wireless communication capability may enable the smart devices 102a-102n to operate as a hub for a variety of network-connected devices. For example, the network-connected devices may communicate directly with the smart devices 102a-102n on a local network and the smart devices 102a-102n may communicate information from the network-connected devices to the cloud computing service 104 via the internet 50.

The smart devices 102a-102n may be configured to communicate the sensor data and/or the inferences made in response to performing sensor fusion operations on the sensor data to the cloud computing service 104 and/or the user devices 106a-106n via the network 50. The smart devices 102a-102n may operate independently of the network 50 (e.g., without instructions from the cloud computing service 104 and/or the user devices 106a-106n). Communication with the cloud computing service 104 and/or the user devices 106a-106n may enhance the capabilities of the smart devices 102a-102n. In one example, the processing capabilities of the cloud computing service 104 may enable faster and/or more detailed video analysis of the video frames and/or audio data captured by the smart devices 102a-102n. In another example, the cloud computing service 104 may enable greater storage capacity than is available on the smart devices 102a-102n.

The cloud computing service 104 may be configured to provide processing and/or mass storage for the system 100. Generally, the cloud computing service 104 may be located off-site from the smart devices 102a-102n. The cloud computing service 104 may be configured to store data, retrieve and transmit stored data, process data and/or communicate with other devices.

In some embodiments, the video analysis and/or audio analysis may be performed by the processor 112 implemented by the smart devices 102a-102n (e.g., local inferencing performed by an edge device). For example, the smart devices 102a-102n may implement a machine learning model configured to run on a low-powered and/or low-resource device such as the smart devices 102a-102n. In some embodiments, the smart devices 102a-102n may be configured to generate the video frames and capture the audio input and upload the video frames and audio input to the cloud computing service 104. The cloud computing service 104 may perform the video analysis and/or the audio analysis (e.g., inferencing performed remotely by a cloud processing service). For example, the cloud computing service 104 may comprise high-powered and/or have access to more computing resources in order to implement the machine learning model. The cloud computing service 104 may generate results based on the video analysis and/or the audio analysis and the results may be transmitted to the smart devices 102a-102n.

The user devices 106a-106n may enable a user to send and/or receive information to/from the smart devices 102a-102n. The user devices 106a-106n may provide a graphical user interface to enable a property owner (or another authorized person) to interact with the smart devices 102a-102n (e.g., a companion app). In an example, the graphical user interface of the user devices 106a-106n may be used to adjust the settings of the various sensors implemented by the smart devices 102a-102n. In another example, the companion app may provide an interface to provide a schedule to control greetings output by the smart devices 102a-102n. In yet another example, the companion app may be used to enable 2-way audio between the visitor 60 and the property owner (e.g., without having to be physically near each other).

The user devices 106a-106n may be configured to communicate with the cloud computing service 104. For example, the user devices 106a-106n may be configured to retrieve video data and/or audio data stored by the cloud computing service 104. The user devices 106a-106n may be configured to receive notifications from the smart devices 102a-102n and/or the cloud computing service 104. In one example, the notification may be a message that indicates that the sensors 110a-110n of the smart devices 102a-102n have detected an object (e.g., a person, a vehicle, a package, etc.).

The user devices 106a-106n may be implemented as portable devices configured to display graphics (e.g., text, interfaces, video, etc.), communicate audio (e.g., send and receive audio) and/or communicate with a network (wired or wirelessly). In some embodiments, one or more of the user devices 106a-106n may be implemented as a smartphone, a smart watch, a tablet computing device, a phablet, a desktop computer, a laptop computer, a netbook, etc. The user devices 106a-106n may be configured to execute instructions to provide the companion app that enables and/or facilitates communication between the user devices 106a-106n and the smart devices 102a-102n. In some embodiments, the user devices 106a-106n may be implemented as a voice-controlled device (e.g., implemented without a display, and uses voice input to receive instructions and audio output to provide information to the end user, such as an Amazon Alexa, a Google Home, etc.). The type of devices implemented as the user devices 106a-106n may be varied according to the design criteria of a particular implementation.

A speech bubble 142 is shown. The speech bubble 142 may be an audio message generated by the smart devices 102a-102n. In the example shown, the audio message 142 may be a greeting generated in response to the detected visitor 60. The smart devices 102a-102n may comprise an audio output device (e.g., an audio processor and/or a speaker) to generate audio and/or the speech 142. In the example shown, the visitor 60 may be an object detected based on the video analysis of the video frames. In one example, the audio message 142 may be intelligently selected by each of the smart devices 102a-102n in response to the visitor 60, characteristics of the visitor 60 and/or behavior of the visitor 60. In another example, the audio message 142 may be real-time two-way communication to enable a remote operator to speak from another location using the smart devices 102a-102n.

The smart devices 102a-102n may be configured to use artificial intelligence to generate context-relevant speech (e.g., select an appropriate greeting when the visitor 60 is detected, a personalized greeting when a resident is detected, delivery instructions when a package is detected, an appropriate audio reaction to sounds made by the visitor 60, etc.). The smart devices 102a-102n may be configured to implement sensor fusion to make inferences based on various sensor readings. The sensor fusion may enable inferences to be made by combining sensor readings from disparate sources that would not be able to be determined from reading one of the sensor readings alone. Implementing the sensor fusion may enable the smart devices 102a-102n to implement a conversational artificial intelligence.

The field of view 108a may represent an area monitored by the smart devices 102a-102n. The field of view 108a may capture the visitor 60. The smart devices 102a-102n may be configured perform video analysis on video frames to detect the visitor 60 and determine an identity of the visitor 60. The smart devices 102a-102n may generate metadata for the video frames captured that indicates that the visitor 60 was detected in the field of view 108a at a particular time. For example, one or more features/characteristics (e.g., the face, the height, the gait, etc.) of the visitor 60 may be detected by the smart devices 102a-102n and compared with stored features/characteristics. The video analysis may be used to determine a classification and/or identification of the visitor 60 based on the object detected and/or the features/characteristics of the object.

A speech bubble 144 is shown. The speech bubble 144 may be a response from the visitor 60. In the example shown, the speech bubble 144 may be a vocal response to the audio message 142. In some embodiments, the speech bubble 144 may be a noise caused by the visitor 60 (e.g., breaking glass, knocking on a door, etc.). The smart devices 102a-102n may comprise an audio capture device (e.g., an audio processor and/or a microphone) configured to receive audio and/or the response 144. In the example shown, the visitor 60 may be an object detected based on the video analysis of the video frames. The audio input 144 may be received by the smart devices 102a-102n. The audio input 144 may be analyzed (e.g., audio analysis) in order to determine the content of the audio input 144. The content of the audio input 144 may be used to generate a context-appropriate reaction. Analyzing the audio input 144 may be part of the analysis of the response of the visitor 60 (e.g., the behavior of the visitor 60). The audio message 142, the response 144 and/or the reaction by the smart devices 102a-102n may be part of the active engagement implemented by the smart devices 102a-102n.

In some embodiments, the smart devices 102a-102n may be configured to perform the authentication of the visitor 60. In one example, the identification performed by the audio analysis may implement the authentication. Other sensors implemented by the smart devices 102a-102n may be configured to provide evidence and/or confidence for the authentication. For example, video analysis, voice detection, RFID, etc. may be implemented to perform the authentication. In some embodiments, the audio message 142 may be generated in response to the authentication (e.g., the authentication may provide the identity of the visitor 60, and the audio message 142 may be configured to greet the visitor 60 by name based on the identification).

The authentication may be configured to enable the smart devices 102a-102n to receive commands from the visitor 60. In one example, if the visitor 60 has been authenticated, the visitor 60 may provide voice-based commands (e.g., the audio input 144 may be the voice-based commands if the visitor 60 is authentication). For example, there may be a list of voice commands that property owners would like to have while outside the home. To enable voice commands outside the home, authentication may be implemented. With authentication, the voice commands may be configured to provide wireless control of various network-connected devices (e.g., door locks, garage door openers, outdoor lighting, keeping the devices quiet, arm/disarm door alarm systems, etc.). The smart devices 102a-102n may be configured to receive the commands, and then perform a functionality corresponding to the commands. The functionality corresponding to the received commands may be performed by one or more of the network-connected devices. The smart devices 102a-102n may communicate (e.g., wirelessly) the commands to the network-connected devices. The detection of the audio input 144 may be stored as part of the metadata.

A robust and easy outdoor classification process may be implemented by the smart devices 102a-102n. The identification and/or classification may rely on two or more data points and/or signals (e.g., sensor fusion). Once visitors are authenticated (e.g., against a whitelist (or allow list) of approved visitors such as family and friends), other detected visitors may be considered 'unfamiliar' and/or 'unwanted' visitors.

The system 100 may be configured to provide a reaction to the visitor 60 detected, the classification detected and/or the behavior of the visitor 60 detected. The smart devices 102a-102n may implement a hub that provides a connection to the Internet (e.g., the network 50) and provides control to other network connected devices. For example, one or more of the smart devices 102a-102n may perform an authentication and initiate the reaction (e.g., a command) in response to a voice command. The reaction may be initiated by controlling another network connected device such as a door lock. Generally, one or more of the smart devices 102a-102n and/or one or more of the internet-connected devices may implement a microphone (e.g., for voice authentication, to analyze the vocal response 144 by the visitor 60 and/or to receive the voice command 144).

A combination of audio (e.g., voice) analysis, video analysis and/or a schedule may enable intelligent selection of the audio message 142 and/or the reaction to the input audio 144. The characteristics detected may be used to adjust a confidence level of the classification and/or identification of the visitor 60. When the confidence level is determined to be above a threshold (e.g., 99% confidence) then the audio message 142 and/or reaction may be selected. The confidence level may represent a likelihood that the classification and/or identification of the visitor 60 determined is correct. Classification and/or identification factors (e.g., characteristics) may comprise facial recognition, a barcode, hand gestures, height of visitors, etc.

The smart devices 102a-102n may be configured to generate different audio messages and/or reactions that may be adapted to the situation. In one example, the situation may be the time of day. The audio message 142 and/or the reaction may be selected to correspond to the detected time of day. For example, the audio message 142 may be a greeting that comprises "good morning" may be selected for the morning (e.g., between 6 am and 11 pm) and another greeting that may comprise "good evening" may be selected for the evening (e.g., between 4 μm and midnight). Similarly, the selection of the reaction may be affected by the time of day (e.g., a welcome message during the day, and a warning to leave the premises at night).

The reaction may be selected based on an analysis of the video and/or audio detected after the audio message 142 has been provided. The reaction may be further selected based on other factors. In one example, the reaction may be further selected based on the time of day. In another example, the reaction may be further selected based on using sensors implemented by the smart devices 102a-102n (e.g., using sensor fusion). In yet another example, the reaction may be further selected based on settings input on the companion app. The selection of the audio message 142 and/or reaction may be triggered by the detection of the visitor 60 at any time of (e.g., available 24/7). For example, the visitor 60 may be an unexpected visitor (e.g., an unrecognized person). In another example, the visitor 60 may be an expected visitor (e.g., a scheduled appointment and/or a face recognized using facial recognition video analysis). In yet another example, the video analysis may detect a package delivery and the visitor 60 may be the delivery person with a delivered package at the door.

Using camera sensor technology, AI technology (performed by the server 104 and/or the smart devices 102a-102n), and market understanding of user behavior, the smart devices 102a-102n may be configured to automatically select the audio message 142 and/or the reaction to deliver depending on the detected circumstance. The reaction may comprise a sequence of interactions with the visitor (e.g., continuous, active engagement).

The video analytics may be used to detect and/or classify objects (e.g., the visitor 60). Other sensor data may be captured (e.g., audio, motion, temperature, light levels, etc.). The processor 112 on the smart devices 102a-102n and/or distributed (e.g., cloud) processing may be configured to perform sensor fusion to make inferences using information from multiple disparate sources (e.g., inferences that may not be performed from a single source of information alone). In one example, using video analytics and conversational AI, a package delivery person may be detected. The reaction may comprise specific instructions provided by the smart devices 102a-102n when the package delivery person is detected. For example, the conversational AI may provide the reaction having an audio message such as, "please leave packages behind planter".

The smart devices 102a-102n may be configured to intelligently react to responses (e.g., the audio response 144) by the detected visitor 60. For example, the smart devices 102a-102n may provide reactions that comprise learning questions to attempt encourage the visitor 60 to provide information that may be used to identify and/or classify the visitor 60. Once the smart devices 102a-102n learn the type (e.g., classification) of the visitor 60, the smart devices 102a-102n may generate reactions appropriately (e.g., contextually accurate reactions). For example, if the smart devices 102a-102n identify the visitor 60 as a burglar, the smart devices 102a-102n may provide escalating reactions (e.g., first ask the burglar to leave politely, then provide a warning, then perform more aggressive actions such as sounding an alarm, then contacting the police, etc.). In response to detecting and/or classifying the visitor 60, the processor 112 may generate metadata for the captured video frames that indicate that the visitor 60 has been detected in the captured video frames.

After providing an action based on the selected reaction (e.g., asking a question), the smart devices 102a-102n may observe the response of the visitor 60. The next reaction performed by the smart devices 102a-102n may be selected based on the response of the visitor 60 (e.g., determined by further performing video analysis and/or audio analysis).

For example, if the visitor 60 leaves, then no next reaction may be necessary. If the visitor 60 provides a name in the response 144, then the next reaction may include the name of the visitor (e.g., "Hi, Bob, we were expecting you, please wait while we come to the door"). The user devices 106a-106n are shown comprising a number of blocks (or circuits) 150a-150n. The circuits 150a-150n may implement various hardware components of the user devices. In an example, the circuit 150a may implement a processor, the circuit 150b may implement a memory, the circuit 150c may implement an input/output (I/O) interface, the circuit 150d may implement a communications module, etc. The circuits 150a-150n may enable the user devices 106a-106n to present output and/or receive input. The circuits 150a-150n may be configured to execute computer readable instructions. The number, type and/or functionality of the circuits 150a-150n may be varied according to the design criteria of a particular implementation.

The user devices 106a-106n may comprise a block (or circuit or module) 160.

The module 160 may be the companion app. In an example, the companion app 160 may implement a video feed monitoring app configured to provide a mobile distributed security response. The various hardware circuits 150a-150n may be configured to execute the computer readable instructions to display output, receive input and/or determine internal states for the companion app 160. The companion app 160 may be configured to implement the AI-based security monitoring service. The companion app 160 may be configured to intelligently display video feeds in response to the video data generated by the smart devices 102a-102n and/or events detected. The companion app 160 may be configured to enable the real-time two-way communication (e.g., the generation of the audio output 142 and the reception of the audio response 144). In one example, the companion app 160 may be a mobile app and/or a desktop executable program. In another example, the companion app 160 may be implemented as a web-app. In another example, the companion app 160 may be implemented as a conversational application for a smart home device (e.g., no video feed may be available for a smart home device without a screen). For example, the companion app 160 may be an Amazon Alexa Skill. The companion app 160 may be configured to operate using various computing devices (e.g., mobile phones, desktop computers, laptop computers, netbooks, tablet computing devices, smart home devices, etc.) and/or operate using various operating systems (e.g., Windows, iOS, Linux, Android, etc.). The functionality of the companion app 160 may be varied according to the design criteria of a particular implementation.

The AI model 132 may be configured to intelligently select the video feeds for the companion app 160 to display and/or the arrangement for displaying the video feeds. The AI model 132 may be configured to filter out only events of interest as the events occur. The AI model 132 may be configured to determine the output selected for the smart security devices 102a-102n. In an example, the AI model 132 may determine the order of responses to generate the increasingly severe messages. The AI model 132 may be configured to determine when to generate a request for live engagement (e.g., from a security service) and/or when to request a physical presence (e.g., request an on-scene visit from a security guard (or security personnel) or the police as a last resort). The AI model 132 may be configured to learn in response to feedback. The learning performed by the AI model 132 may be based on feedback received in response to the arrangement of the video feeds displayed, feedback received in response to detecting events, feedback received in response to selecting particular reactions for the smart devices 102a-102n, feedback received in response to enabling live engagement, feedback received in response to deploying on-site security, etc.

Figure 3:
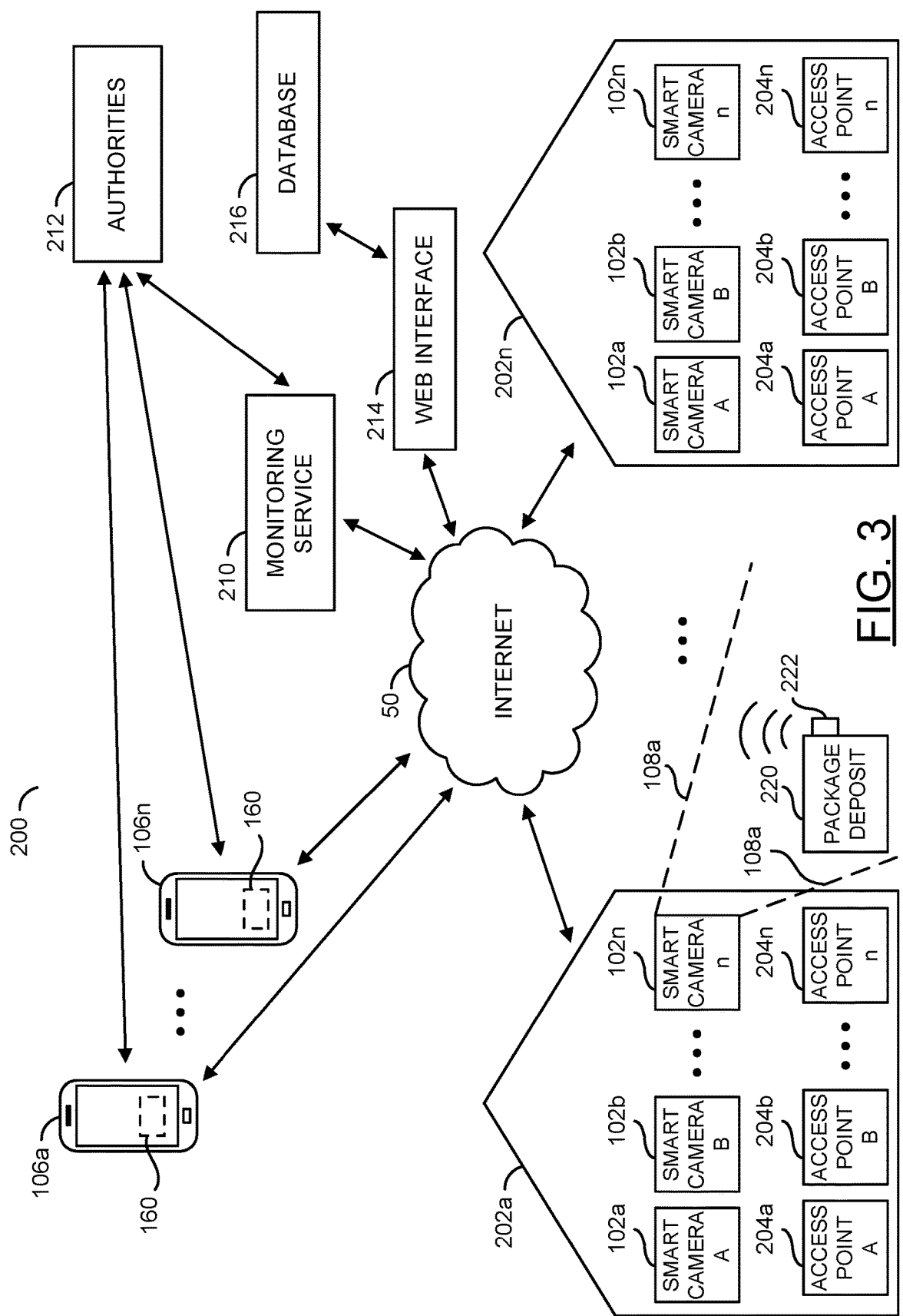
FIG. 3 is a diagram illustrating an example cloud-based security system.

Referring to FIG. 3, a diagram illustrating an example cloud-based security system 200 is shown. The system 200 generally comprises blocks 202a-202n. The blocks 202a-202n may be homes and/or business premises. Each of the homes 202a-202n may comprise blocks 204a-204n. The blocks 204a-204n may be areas of interest (e.g., access points to the homes and/or business premises 202a-202n). The smart cameras (e.g., implemented as doorbells, floodlights, security cameras, etc.) 102a-102n may be set up at each of the areas of interest 204a-204n of the homes and/or business premises 202a-202n. For example, the smart cameras 102a-102n may be configured to monitor the areas of interest 204a-204n.

The system 200 may further comprise the internet 50 and/or the cloud service 104, the mobile devices 106a-106n, a monitoring service 210, authorities 212 (e.g., for in-person response), a web interface 214 and/or a database 216. The companion app 160 is shown implemented by the mobile devices 106a-106n. In one example, the monitoring service 210 may be a virtual monitoring service. In another example, the monitoring service 210 may be a person from a central monitoring service (e.g., a live receptionist working at a remote call center that may be located anywhere in the world). In one example, the authorities 212 may be the police department, the fire department, an ambulance, a private security service and/or other emergency services. The web interface 214 may be used to generate the interface for the companion app 160.

In one example, the video feed monitoring app 160 may be used by monitoring personnel and/or patrol guards. The monitoring personnel may be located on-site and/or at an entirely different (e.g., remote location). The monitoring personnel may work for the central monitoring service 210 and/or a small distributed office monitoring. The patrol guard may be a person located on-site that may provide a live response. The patrol guard may use the video feed monitoring app 160 while on patrol and may receive notifications of events. The patrol guard may respond to the notification of the events by moving to the location of the event to provide a human presence on-site. The video feed monitoring app 160 may route the patrols of the patrol guards geographically near the protected sites 202a-202n. The video feed monitoring app 160 may route the patrol guards to a next site on a designated route (e.g., route the patrol guards from a first location at the property 202a to a second location at the property 202b).

The areas of interest 204a-204n may be doors, windows, garages, other entrances, and/or vantage points. Generally, the smart cameras 102a-102n may be mounted at the areas of interest 204a-204n. Data from the smart cameras 102a-102n at the homes and/or business premises 202a-202n may be sent to the internet and/or cloud service 104.

Data sent to the internet 50 and/or the cloud service 104 may be sent to the user devices 106a-106n. For example, an alert from one of the smart cameras 102a-102n from the home 202a may be sent to the device 106a of the homeowner indicating that another family member has arrived home. In another example, an alert from one of the smart cameras 102a-102n from the home 202n may be sent to the smartphone 106c of an owner of another home (e.g., the owner of the home 202b) that a suspicious person has been identified in the neighborhood. Users may then send a notification to the authorities 212. In yet another example, the device 106a may receive an alert from one of the smart cameras 102a-102n indicating that a package has been delivered. A user of the user devices 106a-106n may send data back to the smart cameras 102a-102n of the homes and/or business premises 202a-202n through the internet and/or cloud service 104. In one example, a homeowner may send a command to arm an alarm (e.g., one of the security responses) at their home.

In one example, the user devices 106a-106n may be in the possession of trusted volunteers. The trusted volunteers may be other home owners in the system 200. The trusted volunteers may be the first line of response to a security issue detected by the system 200. Alerts by the system 200 may be sent in parallel to all the trusted volunteers. The trusted volunteers may use available communication channels provided such as cell phones, telephone and/or emails. The homeowner may use the companion application 160 to schedule particular predefined responses (e.g., the audio message 142 and/or reactions) to particular alerts such as calling the authorities 212 (e.g., the police and/or the fire department). The trusted volunteers may be able to activate a set of predefined actions using the user devices 106a-106n. The trusted volunteers may take training sessions to learn how to properly respond to various alerts. The training sessions may be taken on-line. The on-line training sessions may be available on the web interface 214 and/or using the companion application 160. For example, the web interface 214 may be used to access the companion application 160 via a desktop computer and/or smart TV.

If the network of trusted neighbors 202a-202n has the same system (e.g., one or more of the smart cameras 102a-102n), they may exchange images, video, and/or other information of unwelcome visitors. The website and/or web interface 214 may have access to the storage database 216 implemented by the cloud computing service 104 (e.g., stored in the storage servers 120a-120n) to manage the images, video, and/or other information. Unwelcome visitors stored in the database 216 may be shared with other neighbors and/or the authorities 212 using the web interface 214. For example, when the unwelcome visitors learn about the database 216 they may not target the neighborhood 202a-202n. Data in the database 216 may be used to classify types of visitors (e.g., comparisons may be performed between the captured video data and information in the database 216).

In some embodiments, the mobile devices 106a-106n may be used by patrol officers such as the authorities 212 (e.g., police, private security, etc.). The mobile devices 106a-106n may enable the patrol officers 212 to remotely monitor the video feeds generated by the smart cameras 102a-102n. For example, the patrol officers 212 may patrol the neighborhood 202a-202n in a vehicle and the mobile devices 106a-106n may be implemented within the vehicle. The companion app 160 may indicate which access points 204a-204n have events detected and alert the patrol officers 212.

Multiple levels of alerts may be implemented to distinguish unwelcome visitors from welcomed visitors (e.g., household members). Since most visitors may be welcomed, identifying strangers and raising the level of alert for immediate attention may be important. To prevent false alarms the smart cameras 102a-102n may be configured to provide automatic greetings (e.g., the audio message 142). The automated audio message 142 and/or the reactions may be implemented to engage the visitor 60 (e.g., implement a conversational AI). Engaging the visitor 60 may enable the AI model 132 implemented by the processor of the smart devices 102a-102n and/or the remove device 104 to analyze video of the visitor 60 (e.g., by having them face the lens to talk) and/or determine the behavior of the visitor 60.

The technology to identify and/or classify welcomed visitors may include facial recognition, voice recognition, machine learning of habits and schedules of household members, and/or user inputs when errors occur. Learned behavior may be used to determine which predefined function to perform. For example, the learned behavior may determine that nobody is home at a particular time, and the predefined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 200 may determine that exterior lighting is needed and/or interior lighting is not needed. In another example, if a family is on vacation the system 200 may turn on interior lighting to make it appear to a potential burglar that the home is occupied. The learned behavior may develop a unified status of the home (e.g., based on occupancy, time of day, weather, security status, etc.). Predefined functions may be performed based on the unified status of the home.

In some embodiments, the smart cameras 102a-102n may initiate storage of the video data (e.g., the video streams/feeds) in response to motion detection in the area of interest. The user device 106a (e.g., a smart phone) may be used to allow a user to set a motion threshold for each of the smart cameras 102a-102n. For example, a lower motion threshold may be more sensitive to motion. In another example, a higher motion threshold may be less sensitive to motion (e.g., reduce a number of false positives). The motion threshold may be adjustable.

In some embodiments, the smart cameras 102a-102n may initiate storage of the video data in response to detecting and/or locating a person (e.g., the visitor 60) and/or other type of object (e.g., a delivery vehicle) in the video data. In one example, the video processor of the smart cameras 102a-102n and/or the AI model 132 may analyze the video data to detect people and/or animals. In some embodiments, facial recognition may be implemented to classify and/or recognize visitors. The activation state may be selected based on the classification. In some embodiments, the video data may be analyzed to determine a behavior of the visitors.

In some embodiments, machine learning techniques may be implemented by the AI model 132 to improve detection and/or classification accuracy of visitors and/or objects. For example, the user may use the companion app 160 to provide a correct and/or incorrect label to a detection performed by the smart cameras 102a-102n. If the detection and/or classification is incorrect, the incorrect label may be used by the smart cameras 102a-102n to incorporate an incorrect result of the detection into the machine learning techniques of the AI model 132. In some embodiments, the machine learning techniques may be implemented in the cloud service 104 (e.g., the analysis is performed using cloud computing resources configured to scale available resources on demand to enable learning for the AI model 132).

Similar machine learning techniques may be implemented by the edge AI model 118 implemented by each of the smart devices 102a-102n. Video data and/or correct/incorrect labels may be uploaded and/or stored anonymously (e.g., without personal identification information) by the cloud service 104. The smart cameras 102a-102n may be configured to ignore (e.g., not respond to, not track and/or not send notifications in response to) small animals and/or shadows.

In some embodiments, the smart security cameras 102a-102n may be configured to send notifications to the user devices 106a-106n in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user may create a user account (e.g., comprising at least an email address and a password as credentials) for the cloud service (e.g., using the companion application 160 and/or the web-based interface 214). The user account may allow the user to configure preferences. The preferences may comprise the notification and/or greetings settings. The type of notifications sent by the smart cameras 102a-102n may be based on the notification settings. The smart cameras 102a-102n may implement the activation states and/or arm/disarm the security responses to limit a number of the notifications sent. Intelligently limiting the number of notifications sent may reduce a number of false alarms and/or reduce an amount of data transferred via the network 50 and/or the amount of data processed by the cloud service 104 (e.g., prevent QoS issues and/or dropped data).

The cloud service 104 and/or the database 216 may store portions of the video data from each of the smart cameras 102a-102n. For example, portions of the video data may be saved in response to the particular types of detections. The portions of video data may be video clips. The video clips may be encoded and/or compressed by the video processor of the smart devices 102a-102n and/or the cloud service 104 to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the smart cameras 102a-102n (e.g., a longer video clip may result in response to continuous detections). In some embodiments, the video clips may be pre-padded and/or post-padded with video data before and/or after the detection. For example, the video clip may store video data from a predetermined time before and/or after the detection (e.g., 30 seconds before the detection and/or 30 seconds after the detection for a video clip approximately one minute long). In some embodiments, the video clips may comprise 24/7 storage of the video captured by the smart devices 102a-102n.

In some embodiments, a user interface may be provided for the user devices 106a-106n (e.g., the companion application 160, an executable program, the web-based interface 214, etc.). For example, the companion application 160 may be executable by a computing device such as the user devices 106a-106n. The user interface may allow one or more of the user devices 106a-106n to control various components of the smart cameras 102a-102n. For example, one or more user devices 106a-106n may be configured to access the user account. The control signals may be generated in response to the input from the user devices 106a-106n. For example, an icon may be provided on the user interface representing a light bulb. The user may activate and/or deactivate the light bulb by pressing (touching on a touchscreen, clicking, etc.) a control option using the companion app 160.

Other components such as security response components may be turned on and/or off from the user interface of the companion app 160. For example, one of the controls available in the companion app 160 may be provided to allow the user to control the speaker of one or more of the smart cameras 102a-102n. In one example, the speaker of the smart cameras 102a-102n may playback a pre-recorded audio message (e.g., the user may select from one or more pre-recorded audio messages on the user interface). In another example, the speaker of the smart cameras 102a-102n may sound an alarm (e.g., one or more alarm types may be selected from the user interface of the companion app 160).

In some embodiments, the smart cameras 102a-102n may be configured for two-way audio communications (e.g., an intercom). For example, the voice of a visitor may be received using a microphone of the smart cameras 102a-102n. A communication module implemented by the smart cameras 102a-102n may transmit the received audio to one or more of the user devices 106a-106n and/or the remote device 104. The user devices 106a-106n may playback the audio to the user. The user may speak via a microphone on the user devices 106a-106n. The user devices 106a-106n may transmit the audio to one or more of the smart cameras 102a-102n (e.g., the user may select which of the smart cameras 102a-102n to playback the audio using the companion application 160) via the communication module (e.g., a Wi-Fi connection) implemented by the smart devices 102a-102n. The speaker component of the smart devices 102a-102n may transmit and/or stream the received audio.

The smart cameras 102a-102n may provide various APIs (application programming interface) to connect with other devices (e.g., other home automation devices). For example, the APIs may allow various other devices to communicate with the smart cameras 102a-102n. In one example, the companion application 160 may be configured to receive/transmit data between the smart devices 102a-102n and/or other smart devices (e.g., home heating systems, interior lighting, etc.). For example, the smart cameras 102a-102n and/or other smart devices may provide a smart home security system. The smart cameras 102a-102n may generate control signals based on the communication with the various devices other devices. The types of APIs available may be varied according to the design criteria of a particular implementation.

A package deposit 220 is shown at the home 202a. The package deposit 220 may be implemented to allow the visitor 60 to deliver packages. The package deposit 220 may be implemented as a container, a bag, a delivery slot, a mailbox, etc. In an example, the package deposit 220 may be implemented as a large net with a zipper and a lock. A delivery person may be instructed by the smart security cameras 102a-102n to place a package inside the package deposit 220 and zip up and/or lock the package deposit 220. In some embodiments, the package deposit 220 may implement a hazardous waste storage (e.g., medical waste for a medical facility) and/or other secure information (e.g., confidential data such as attorney documents) and the package deposit 220 may be monitored to ensure proper disposal of materials in the package deposit 220 (e.g., the package deposit 220 may be implemented for package pick-up). The implementation of the package deposit 220 may be varied according to the design criteria of a particular implementation.

A wireless device 222 is shown on the package deposit 220. The wireless device 222 may be configured to transmit wireless signals to indicate a status of the package deposit 220. In an example, the wireless device 222 may send a notification to the smart cameras 102*a*-102*n* indicating that the package has been delivered. In another example, the wireless device 222 may be configured to send a notification to the smart security cameras 102*a*-102*n* indicating that the package deposit 220 has been tampered with. The smart cameras 102*a*-102*n* may forward the notification to one or more of the user devices 106*a*-106*n*. The type of notifications transmitted by the wireless device 222 may be varied according to the design criteria of a particular implementation.

The smart security cameras 102*a*-102*n* may be configured to adjust an activation state in response to a package being delivered and/or picked up (e.g., in response to the notification from the wireless device 222). A security zone is shown in the field of view 108*a* (e.g., the field of view of the lens of the smart security floodlight 102*n*). The smart security camera 102*n* may monitor the security zone within the field of view 108*a* near the package deposit 220. In an example, when the security zone 108*a* is invaded (e.g., by a visitor such as a potential package thief) the smart camera 102*n* may be configured to perform a security response (e.g., activate an alarm, send an alert to a designated user, play the audio message 142, perform various security reactions, etc.). The security zone 108*a* be an area of interest below the smart security floodlight 102*n*. In some embodiments, the capture device may be configured to capture package information about a delivered package (e.g., a bar code, a tracking number, an identification of the delivery person, etc.).

Figure 4:
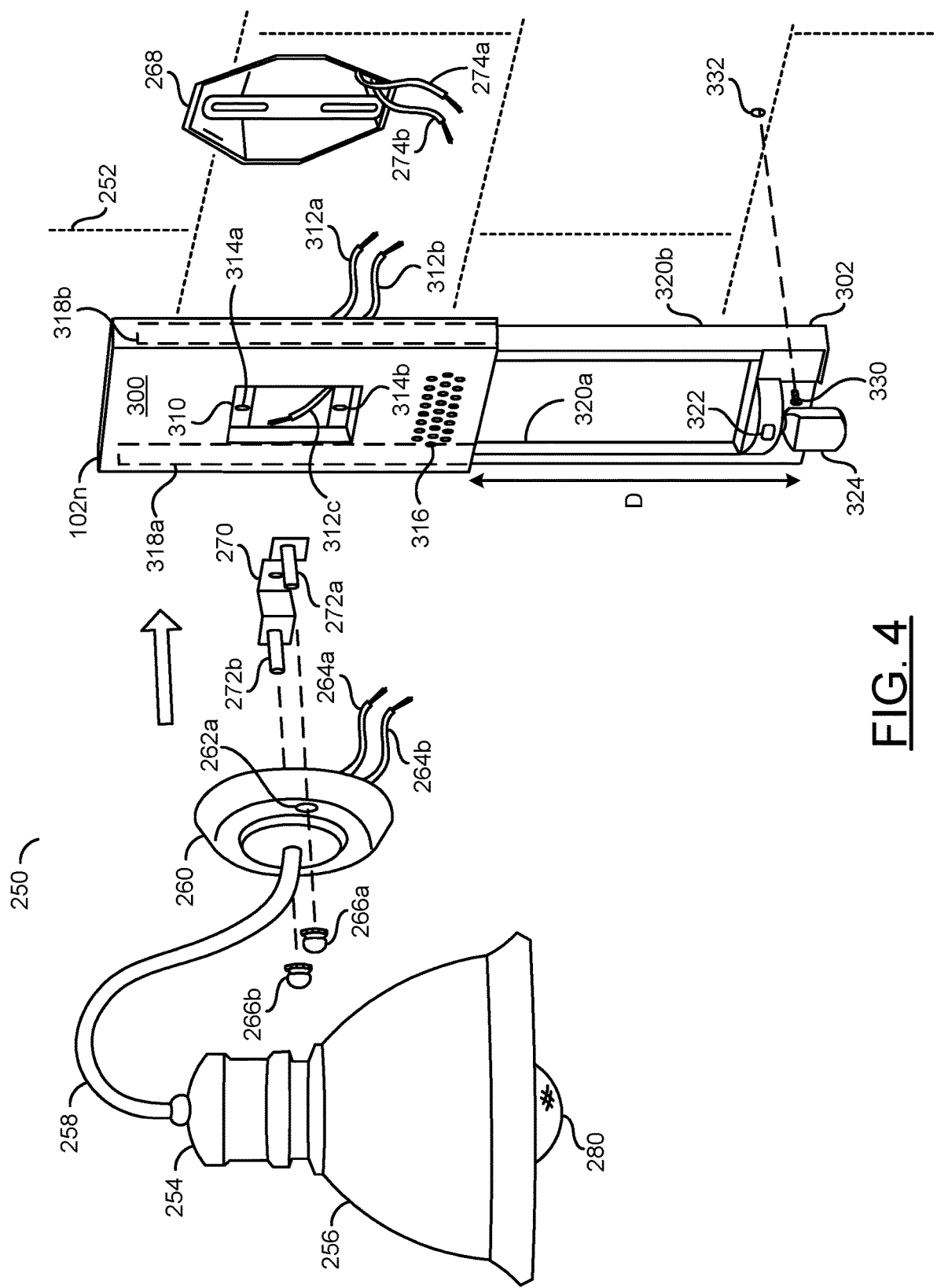
FIG. 4 is a diagram illustrating an example embodiment of a camera wall plate adapter.

Referring to FIG. 4, a diagram illustrating an example embodiment of a camera wall plate adapter is shown. An exploded view 250 is shown. The exploded view 250 may comprise the wall plate adapter embodiment of the smart security light 102*n*, a wall 252, a light fixture 254, a lamp shade 256, a lamp connector 258, a light fixture mounting plate 260, a mounting hole 262*a* (a similar mounting hole 262*b* may be hidden from view), fixture wires 264*a*-264*b*, locking caps 266*a*-266*b*, an electrical junction box 268, a mounting bracket 270, mounting screws 272*a*-272*b* and/or power supply wires 274*a*-274*b*. The wall plate adapter embodiment of the smart security light 102*n* may be similar to the example shown in association with FIG. 2.

The light bulb 280 is shown installed in the lamp shade 256 of the light fixture 254. The mounting hole 262*a* is shown on the light fixture mounting plate 260. The fixture wires 264*a*-264*b* are shown extending from the light fixture mounting plate 260. For example, the fixture wires 264*a*-264*b* may be routed through the light fixture connector 258 to provide power to the light bulb 280 in the lamp shade 256. The locking caps 266*a*-266*b* may be used to secure the light fixture mounting plate 260 to the mounting bracket 270 when the mounting screws 272*a*-272*b* are inserted through the mounting holes 262*a*-262*b*. The mounting bracket 270 may be a custom mounting bracket that may enable the light fixture 254 to be secured to the junction box 268 and the camera wall plate adapter 102*n*. In an example, the smart camera wall plate adapter 102*n* may be installed on the wall 252 in between the junction box 268 and the light fixture 254.

The camera wall plate adapter 102*n* may comprise an adapter plate 300 and a base 302. The adapter plate 300 may comprise an interface 310, adapter wires 312*a*-312*c*, mounting holes 314*a*-314*b*, a speaker grille 316 and channels 318*a*-318*b*. Extendable arms 320*a*-320*b* are shown between the adapter plate 300 and the base 302. The base 302 may comprise a passive infrared (PIR) sensor 322, a camera module 324 and a set screw 330. The adapter plate 300 and/or the base 302 may comprise more components than shown in the example exploded view 250. The number, type and/or arrangement of the components of the adapter plate 300 and/or the base 302 may be varied according to the design criteria of a particular implementation.

The interface 310 may enable the mounting bracket 270 to secure the light fixture 254 and the camera wall plate adapter 102*n* to the junction box 268. The interface 310 may enable the fixture wires 264*a*-264*b* to pass through the camera wall plate adapter 102*n*.

The adapter wires 312*a*-312*c* may be configured to connect to the power supply wires 274*a*-274*b* and the fixture wires 264*a*-264*b* to enable a power supply of the premises provided at the junction box 268 to be supplied to the camera wall plate adapter 102*n* and the light fixture 254.

The interface 310 may comprise one or more openings (e.g., the mounting holes 314*a*-314*b*) for fasteners (e.g., openings for screws). For example, cross bars may be secured to the interface 310 to enable a mechanical connection between the adapter plate 300 and the light fixture 254. When the light fixture 254 is installed, the light fixture mounting plate 260 may cover the interface 310.

The adapter plate 300 may comprise the hollow channels 318*a*-318*b* to enable the extendable arms 320*a*-320*b* to slide into and out of the adapter plate 300. Sliding the extendable arms 320*a*-320*b* into and out of the hollow channels 318*a*-318*b* may cause a distance D between the adapter plate 300 and the base 302 to adjust. Sliding the extendable arms 320*a*-320*b* into the hollow channels 318*a*-318*b* may retract the base 302 (e.g., shorten the distance between the adapter plate 300 and the camera module 324). Sliding the extendable arms 320*a*-320*b* out of the adapter plate 300 may extend the base 302 (e.g., lengthen the distance D between the adapter plate 300 and the camera module 324).

The extendable arms 320*a*-320*b* may be configured to enable the distance D between the adapter plate 300 and the base 302 to be adjusted. In some embodiments, the extendable arms 320*a*-320*b* may be configured to slide into the adapter plate 300. In some embodiments, the extendable arms 320*a*-320*b* may be configured to slide into the base 302. In some embodiments, the extendable arms 320*a*-320*b* may be collapsible (or telescoping). In the example exploded view 250, two of the collapsible arms 320*a*-320*b* are shown. In some embodiments, one extendable arm may be implemented between the adapter plate 300 and the base 302. In some embodiments, more than two of the extendable arms 320*a*-320*b* may be implemented. The design of the extendable arms 320*a*-320*b* may be varied according to the design criteria of a particular implementation.

The adapter plate 300 may be configured to enable the light fixture 254 to be mounted to the wall 252. The adapter plate 300 may be located (e.g., clamped) between the wall 252 and the light fixture 254 (e.g., secured using the light fixture mounting plate 260). The adapter plate may provide the interface 310. The interface 310 may be configured to enable a mechanical connection and an electrical connection. In an example, the electrical connection may be implemented using the adapter wires 312*a*-312*c*. The electrical connection may be between a power supply provided via the junction box 268, the camera wall plate adapter 102*n* and the light fixture 254. In an example, the mechanical connection may be between the wall 252 (or the junction box 268), the camera wall plate adapter 102*n* and the light fixture 254. The mechanical connection may enable the light fixture 254 to be attached to a front side of the adapter plate 300.

The interface 310 may comprise the adapter wires 312a-312c. The adapter wires 312a-312c may be color coded according to local rules/codes/regulations. In an example, the interface 310 may comprise three wires 312a-312c. The neutral (return) wire 312a from the interface 310 may be tied together using a wire nut with the neutral wire 274a from the junction box 268 and the neutral wire 264a from the light fixture/sconce 254. The hot wire (AC power) 312b from the interface 310 may be tied together using a wire nut with the hot wire 274b from the junction box 268 to provide a constant AC power to a power adapter implemented in the adapter plate 300 (to be described in association with FIG. 5). The interface 310 may comprise a controlled hot (AC) wire 312c that may be tied together using a wire nut with the hot (AC) wire 264b from the light sconce 254. Then the power adapter of the camera wall plate adapter 102n may provide control (e.g., controlled AC power) to turn the light 280 on/off.

The base 302 may comprise the camera module 324. The camera module 324 may be configured to capture video data. The base may comprise internal circuitry (to be described in association with FIG. 5). The circuitry may enable the functionality of the camera wall plate adapter 102n (e.g., video capture, wireless communication, facial recognition, motion detection, two-way audio, etc.).

The base 302 may comprise one or more screws at the bottom. In the example exploded view 250, the single set screw 330 is shown on the base 302. The set screw 330 may be configured to secure the base 302 to the wall 252 (e.g., to maintain a desired distance between the camera module 324 and the adapter plate 300). A screw hole 332 is shown on the wall 252. The screw hole 332 may be created by the installer at a location where the installer desires the base 302 to be extended to. The set screw 330 may be inserted through the base 302 and into the screw hole 332 to secure the base 302 to the wall 252 at the desired distance from the adapter plate 300. Securing the set screw 330 may be one method of locking the amount of extension of the extendable arms 320a-320b. In the example shown, the set screw 330 is located behind the camera module 324 and the set screw 330 may be accessible when the camera module 324 is tilted to the side and/or forwards/upwards.

The distance (e.g., D) is shown. The distance D may be a distance between the adapter plate 300 and the camera module 324. Adjusting the moving the extendable arms 320a-320b may adjust the distance D. For example, sliding the extendable arms 320a-320b into the adapter plate 300 may decrease the distance D. The distance D may be reduced until the base 302 abuts the adapter plate 300 (e.g., a distance of approximately zero between the adapter plate 300 and the camera module 324). In another example, sliding the extendable arms 320a-320b out from the adapter plate 300 may increase the distance D. The distance D may extend to a length based on the size of the arms 320a-320b.

A hinge may connect the camera module 324 to the base 302. The camera module 324 may be configured to swivel to the left or right. The camera module 324 may be configured to tilt up or down. The hinge on the base 302 may enable the tilting/swivelling. For example, the hinge may rotate left/right with respect to the base 302 to swivel the camera module 324. In another example, the hinge may bend up/down at the camera module 324 to tilt the camera module 324 up/down.

In the example shown, the smart camera adapter plate 102n is shown attached to the light fixture 254 with the lamp shade 256 that hangs down. The smart camera adapter plate 102n may be configured to flipped upside down (e.g., the extendable arms 320a-320b extend up from the adapter plate 300) to enable the camera module 324 to be extended up over a lamp shade that is mounted upwards. Details of the smart camera adapter plate 102n and/or the attachment to the light fixture 254 may be described in association with U.S. patent application Ser. No. 16/585,342 (now U.S. Pat. No. 10,887,958), filed on Sep. 27, 2019 and U.S. patent application Ser. No. 17/026,647, filed on Sep. 21, 2020, appropriate portions of which are hereby incorporated by reference. The design, style and/or components implemented by the smart camera adapter plate 102n may be varied according to the design criteria of a particular implementation.

Figure 5:
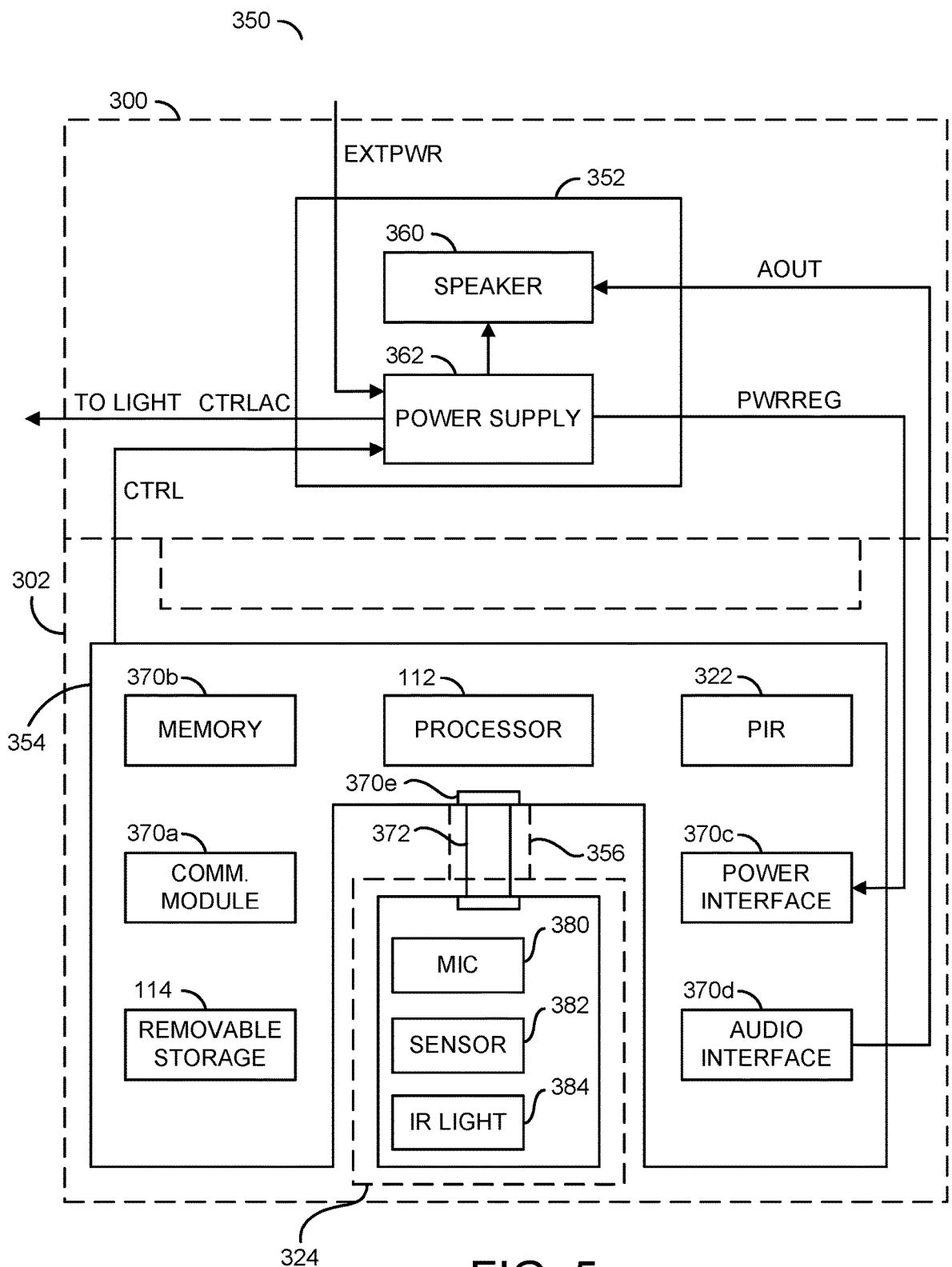
FIG. 5 is a block diagram illustrating example components of a camera wall plate adapter.

Referring to FIG. 5, a block diagram illustrating example components of the camera wall plate adapter 102n is shown. A block diagram 350 is shown comprising the adapter plate 300, the base 302 and/or the camera module 324. The adapter plate 300 may comprise a block (or circuit) 352 and the base 302 may comprise a block (or circuit) 354. A hinge 356 may connect the circuit 354 to the camera module 324. The circuit 352 may comprise a block (or circuit) 360 and/or a block (or circuit) 362. The circuit 360 may implement a speaker. The circuit 362 may implement a power supply. The circuit 352 may receive a signal (e.g., EXTPWR), a signal (e.g., CTRL) and/or a signal (e.g., AOUT). The circuit 352 may present a signal (e.g., CTRLAC) and/or a signal (e.g., PWRREG). The number, type and/or function of signals generated by and/or received from the circuit 352 and/or the number, type and/or arrangement of the components of the circuit 352 may be varied according to the design criteria of a particular implementation.

The signal EXTPWR may provide the AC power to the power adapter 362. In an example, the signal EXTPWR may be presented by the power supply wires 274a-274b and received at the interface 310 using the adapter wires 312a-312c. The signal EXTPWR may be received by the power adapter 362.

The signal CTRLAC may provide controlled AC power to the light sconce 254. The controlled AC power CTRLAC may enable the camera wall plate adapter 102n to control the light bulb 280 in the light sconce 258. In an example, the signal CTRLAC may be a passthrough of the signal EXTPWR. The signal CTRLAC may be transmitted from one of the adapter wires 312a-312c to the fixture wires 264a-264b.

The signal CTRL may be received by the power adapter 362. The signal CTRL may be generated by the circuit 354. The signal CTRL may provide feedback to enable the signal CTRLAC (e.g., enable the passthrough of the signal EXTPWR). For example, the signal CTRL may enable the circuit 354 to control the power adapter 362 (e.g., control the generation of the signal CTRLAC) that controls the status of the light 280. For example, the user may provide an instruction from the companion app 160 that is configured to function with the circuit 354 and the circuit 354 may communicate the signal CTRL to the power adapter 362 to enable the control of the light bulb 280 using the signal CTRLAC. The signal CTRL may be transmitted using the connector 254.

The power adapter 362 may provide the signal PWRREG to the circuit 354. For example, the signal PWRREG may be a regulated DC voltage. The power adapter 362 may be able to convert the AC power from the signal EXTPWR to a DC power supply. The DC power supply may be presented as the signal PWRREG. The signal PWRREG may be transmitted using the light fixture connection 258.

The signal AOUT may be received by the speaker 360. The signal AOUT may be received from the circuit 354. The signal AOUT may be an audio signal. The speaker 360 may output audible sounds in response to the signal AOUT. The signal AOUT may be transmitted using the connection 254.

The circuit 354 may comprise the processor 112, the removable storage 114, the PIR sensor 322 and/or components 370a-370e. The component 370a may implement a wireless communication module. The component 370b may implement a memory. The component 370c may implement a power interface. The component 370d may implement an audio interface. The component 370e may implement a data interface. In the example 350, components 370a-370e may be implemented. The circuit 354 may implement additional functionality (e.g., the components 370a-370n). For example, the components 370a-370n may implement one or more of the 110a-110n shown in association with FIG. 1. The number, type and/or arrangement of the components 370a-370n may be varied according to the design criteria of a particular implementation.

The communication module 370a may be configured to perform wireless communication. For example, the communication module 370a may be configured to receive instructions from the companion app 160 and/or provide output to the companion app 160. For example, the processor 112 may generate a notification that a visitor has been detected, and the communication module 370a may communicate the notification as a message on the companion app 160. The communication module 370a may implement a Wi-Fi communication protocol, a Bluetooth communication protocol and/or any other (or combination of other) wireless communication protocols.

The memory 370b may be configured to store computer readable instructions. The memory 370b may be configured as a random access memory. In some embodiments, the memory 370b may be configured to store data (e.g., recorded video data, audio to output via the speaker 360, data received via the communication module 370a, etc.). The processor 112 may be configured to execute the computer readable instructions, process input, perform comparisons, make decisions, generate output, etc. The processor 112 may be configured to analyze and/or encode video data.

The PIR sensor 322 may be configured to detect motion. The PIR sensor 322 may be an implementation of the PIR sensor 322 shown in association with FIG. 4. In an example, the PIR sensor 322 may provide input to the processor 112 when motion is detected. The processor 112 may interpret the sensor input (e.g., compare an amount of motion detected by the PIR sensor 322 to a threshold amount of motion) and determine whether to activate the light 280 in response to the motion. The processor 112 may generate the signal CTRL to communicate to the power adapter 362 to activate the light 280 (e.g., by causing the power adapter 362 to generate the signal CTRLAC).

The power interface 370c may be configured to receive the DC voltage from the power adapter 362. For example, the power interface 370c may be an input for the DC power for the circuit 354. The circuit 354 may deliver the DC power from the power interface 370c to the various components 370a-370n.

The audio interface 370d may be configured to provide the signal AOUT. In some embodiments, the audio interface 370f may implement an audio processor. The audio processor and/or audio interface 370d may be configured to perform signal analysis on audio input to parse voice commands and/or interpret spoken words captured by the smart camera 102n. The signal AOUT may be an audio output for the speaker 360. In an example, the processor 112 may select an audio output. The memory 370b may store the selected audio output. The memory 370b may present the selected audio output to the audio interface 370d. The audio interface 370d may convert the stored audio data to a format playable by the speaker 360. In an example, the audio interface 370d may implement a digital to analog converter.

The data interface 370e may be configured to send/receive data to/from the camera module 324. The data interface 370e may be a high speed data bus. The data interface 370e may be configured to receive the video data captured by the camera module 324.

The removable storage 114 may be configured to store the video frames captured by the processor 112. In some embodiments, the removable storage 114 (or the memory 370b) may be configured to store a version of the AI model 132 to enable the processor 112 to perform computer vision operations on the captured video frames. The removable storage 114 may be configured to store audio files. The audio files stored by the removable storage 114 may provide various audio output that may be presented as the signal AOUT. For example, the audio files may comprise one or more audio responses that may enable the smart camera 102n to provide a conversational AI.

The hinge 356 is shown between the base 302 and the camera module 324. A cable 372 is shown within the hinge 356. The cable 372 may be configured to communicate data between the camera module 324 and the data interface 370e. The cable 372 may be a high speed data cable capable of streaming video data (e.g., a high-speed, low-latency ribbon cable for communicating high resolution video frames). In an example, the cable 372 may be a flexible ribbon cable configured to bend and/or twist as the hinge 356 is rotated and/or the camera module 324 is tilted.

The camera module 324 may comprise a block (or circuit) 380, a block (or circuit) 382 and/or a block (or circuit) 384. The circuit 380 may implement a microphone. The circuit 382 may implement a camera sensor. The circuit 384 may implement an IR light. The camera module 324 may comprise other components (not shown). The number, type and/or arrangement of the components of the camera module 324 may be varied according to the design criteria of a particular implementation.

The microphone 380 may be configured to receive input audio. In an example, the audio interface 370d may be configured to convert the analog audio input captured by the microphone 380 into digital data. In some embodiments, the audio interface 370d may comprise the audio processor that may be configured to analyze the audio captured by the microphone 380 and/or interpret speech captured by the microphone 380.

The image sensor 382 may be configured to convert input (e.g., light) into digital information. The digital information generated by the image sensor 382 may be presented to the processor 112 (via the cable 372 and the data interface 370e). The processor 112 may generate video frames in response to the digital information captured by the image sensor 382.

The IR light 384 may be configured to emit IR light. The IR light 384 may enable the capture of data in low light conditions.

The processor 112 may be configured to generate video data from the video frames. In some embodiments, the processor 112 may be configured to perform object detection/recognition. In some embodiments, the communications module 370a may communicate the video data to a remote computing service (e.g., the cloud processing services provided by the distributed servers 122a-122n) that may perform object detection/recognition and communicate the results of the object detection back to the communication module 370a. The processor 112 may be configured to generate the signal CTRL in response to the video data (e.g., the results of the object detection). For example, the signal CTRL may be generated when the visitor 60 is detected to control the light 280. In another example, the processor 112 may generate the signal CTRL to generate other types of actions in response to the results of the object detection (e.g., an alarm, providing a notification to the companion app 160, contact the authorities 212, upload the recorded video data to the storage servers 120a-120n, etc.). In some embodiments, the user devices 106a-106n may implement the companion app 160 that enables a user to remotely provide input to the circuit 354. For example, the user may use the companion app 160 on the smartphone 106b to control a status of the light 280. The smartphone 106b may transmit the input from the user to the communication module 370a. The processor 112 may interpret the input from the user and generate the signal CTRL to control (e.g., to control the status of the light 280).

The circuits 352-354 may comprise various components that may implement the functionality of the smart cameras 102a-102n. The smart camera light 102n may be configured to implement other functionality (not shown). In one example, the smart camera light 102n may implement a bright LED (e.g., a 5 k Lumen A21 light bulb and/or a 4 k Lumen LED floodlight). Details of the functionality of the smart cameras 102a-102n may be described in association with U.S. application Ser. No. 16/850,944, filed on Apr. 16, 2020, appropriate portions of which are hereby incorporated by reference.

Figure 6:
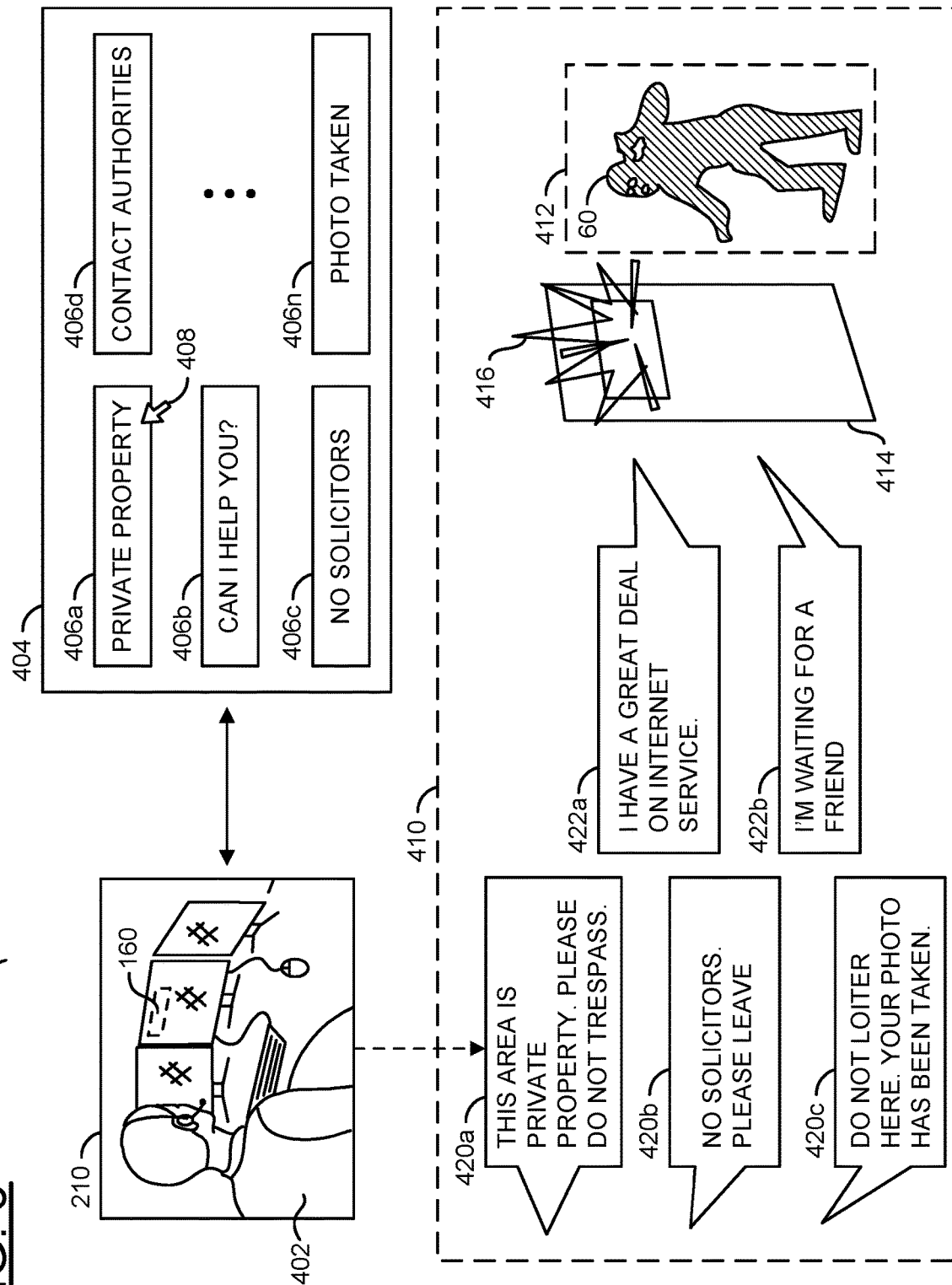
FIG. 6 is a diagram illustrating active engagement and third party service engagement of a visitor.

Referring to FIG. 6, a diagram illustrating active engagement and third party service engagement of a visitor is shown. An example scenario 400 is shown. The example scenario 400 may comprise the third party services 210 selecting reactions and/or tagging metadata for the smart devices 102a-102n.

The monitoring performed by the third party services 210 may be an example of the automatic on demand backup services. For example, if user does not respond to an emergency alert, the third party services 210 may be contacted. The third party services 210 may view a live video feed generated by one or more of the smart camera lights 102a-102n to provide real-time monitoring of the properties 202a-202n. In one example, the third party services 210 may be provided as a subscription-based service (e.g., a premium service that provides the third party services 210 in addition to the manual DIY security monitoring). In another example, the third party services 210 may be provided as the automatic on demand backup service for the per-use and/or time-based fee.

A security guard or security personnel (or receptionist) 402 is shown at the third party services 210. The security personnel 402 may be a remote user. The security guard or security personnel 402 may use the companion app 160 to monitor the video feeds communicated by the smart camera lights 102a-102n from a location remote from the location of the smart security devices 102a-102n (e.g., remote from the detected events). In the example shown, the security guard or security personnel 402 may be the user of the companion app 160. In one example, the security guard or security personnel 402 may be at a remote location from the smart security devices 102a-102n (e.g., in a different city, in a different country, on a different property, etc.). In another example, the security guard or security personnel 402 may be on the same property as the smart security devices 102a-102n (e.g., an attendant in a lobby of an apartment building that uses the smart security devices 102a-102n to monitor the property of the apartment building).

The third party services 210 may select reactions for the smart devices 102a-102n using an interface 404. In an example, the interface 404 may enable the security guard or security personnel 402 to select the reactions and communicate the reactions to the remote device 104. The remote device 104 may forward the reactions selected to the smart security devices 102a-102n. For example, the interface 404 may enable remote manual control of the reactions as an alternate option to the AI model 132 selecting the reactions.

The interface 404 may comprise a list of buttons 406a-406n. The list of buttons 406a-406n may enable the receptionist 402 to select one or more of available audio message reactions that may be played back by the smart camera lights 102a-102n (e.g., via the speaker 360). For example, the interface 404 may implement a soundboard that enables the receptionist 402 to select the audio played back by the smart devices 102a-102n.

A mouse pointer 408 is shown on the interface 404. For example, the receptionist 402 may use the mouse pointer 408 to interact with one of the buttons 406a-406n. The buttons 406a-406n are shown having basic descriptive messages. In an example, the button 406a may correspond to one of the audio message reactions that provides audio indicating that the area is private property. In another example, the button 406n may correspond to one of the audio message reactions that provides audio to indicate to the detected person that a photograph has been taken (e.g., to deter any criminal activity). In the example shown, the buttons 406a-406n may correspond to audio message that may be suitable for a residential property. In examples, where the smart camera lights 102a-102n are implemented at a business property, other audio messages may be available (e.g., to provide business hours, to provide roadside delivery, etc.).

The description of the buttons 406a-406n may be generic to provide a common interface for the third party services 210 regardless of the particular property where the smart devices 102a-102n are located. The audio played by the particular one of the smart devices 102a-102n may be customized. For example, the receptionist 402 may select one of the buttons 406a-406n for providing the business hours of a small business without having to know the detailed business schedule of a particular business. In response to the selection of the business hours button, the smart devices 102a-102n may playback the audio 142 associated with the business hours (e.g., one business may have business hours of 8 am-4 pm, while another business may have hours of 9 am-5 pm). The interface 404 may enable the third party services 210 to have a common interface for selecting context-appropriate reactions without needing to know the exact details of the reaction, in order to provide faster responses (e.g., without needing to look up details for a particular business such as the business hours).

An example video frame 410 is shown. The example video frame 410 may be an example video frame captured by one of the smart devices 102a-102n (e.g., the smart adapter plate 102n). The example video frame 410 may comprise a view of the visitor 60. A dotted box 412 is shown around the visitor 60. The dotted box 412 may represent the computer vision analysis being performed by the processor 112 on the visitor 60. The computer vision analysis 412 may also be performed on inanimate objects (e.g., a door 414). For example, the AI model 132 and/or the video processor 112 may detect and/or classify the visitor 60 as a burglar (e.g., wearing a ski mask, attempting to hide in the shadows, attempting to break into a home, etc.). In another example, the AI model 132 and/or the video processor 112 may detect and/or classify the object 414 as a door. A shape 416 is shown to represent a sound. For example, the sound 416 may be the burglar 60 breaking the glass of the door 414 in order to gain entry to the home. The sound 416 may be one example of the audio input captured by the microphone 380. An audio processor (e.g., one of the components 110a-110n) may analyze the sound 416 to determine the behavior and/or characteristics of the visitor 60. The analysis of the video and/or the audio may be used to determine the characteristics of the visitor 60.

Audio messages 420a-420c are shown. The audio messages 420a-420c may represent the audio output 142 generated by one of the smart security devices 102a-102n. In one example, the audio messages 420a-420c may be generated automatically using an audio processor. In another example, the audio messages may be played in response to the selections 406a-406n performed by the third party services personnel 402. In the example shown, the audio messages 420a-420c may represent a conversation with the visitor 60. Audio responses 422a-422b are shown. The audio responses 422a-422b may represent vocal responses by the visitor 60. For example, the visitor 60 may response to the audio messages 420a-420c with the vocal responses 422a-422b. The vocal responses 422a-422b may be the audio input 144 that may be received by the smart devices 102a-102n. The smart devices 102a-102n may communicate the vocal responses 422a-422b to the third party services 210 to enable the personnel 402 to enable two-way communication.

The audio message 420a from the smart device 102n is shown. The audio message 420a may be selected by the AI model 132 and/or the processor 112 in response to the video analysis and/or audio analysis used to classify the visitor 60 and/or in response to the reaction selected by the receptionist 402. The smart security floodlight 102n may play the audio message 420a to attempt to deter the visitor 60. In the example shown, the audio message 420a selected may be "This area is private property. Please do not trespass".

The smart device 102n may detect the response 422a from the visitor 60. In the example shown, the response 422a may be "I have a great deal on internet services". The smart device 102n may contact the third party services 210. The smart device 102n may provide a recording of the response 422a to the third party services 210. In some embodiments, if the third party services 210 are unavailable or take a long time to connect to the smart device 102n, the smart device 102n may continue the active engagement with the visitor 60 (e.g., generate the reactions 420a-420n) based on decisions from the AI model 132 until the third party services 210 connects.

Connecting to the third party services 210 may be optional and/or depend on settings of the user (e.g., the third party services 210 may not be used unless the user does not respond to an emergency alert when the automatic on demand backup service is active). Generally, switching between the processor 112 (or remote device 104) selecting the reactions 420a-420n and the third party services 210 selecting the reactions 420a-420n may be seamless and/or be unknown to the visitor 60. For example, the third party services 210 may be able to imitate the conversational AI of the AI model 132 and the conversational AI of the AI model 132 may imitate human responses that would be selected by the third party services 210. For example, the smart devices 102a-102n may perform the conversational AI to provide an automated doorman service. If the third party services 210 are contacted, then the smart devices 102a-102n may operate in a different mode where the off-site agent 402 selects the reactions 420a-420n. The off-site agent 402 may enhance the capabilities of the automated doorman service. In one example, the off-site agent 402 may enhance the automated doorman service by enabling a person to speak to the visitor 60 remotely (e.g., provide more complex human interaction than the conversational AI is capable of providing). In another example, off-site agent 402 may enhance the automated doorman service by receiving instructions uploaded by the user. The user may upload specific instructions for the off-site agent 402 via the companion app 160. For example, when a package is expected, the user may upload instructions to allow the off-site agent 402 to sign for the package remotely, and make sure that the delivery person hides the package from view.

When the third party services 210 connects to the smart device 102n, the third party services 210 may receive the recording of the response 422a from the visitor 60. The third party services 210 may use the interface 404 to select the response 420a. In the example shown, the receptionist 402 may select the button 406c to playback the no solicitors message (e.g., since the visitor 60 claims to be selling internet services). The response 420b is shown as "No solicitors. Please leave". The smart device 102n may continue to stream the video and/or audio data to the third party services 210 and/or the remote device 104.

The smart device 102n may stream audio of the response 422b of the visitor 60 (e.g., "I'm waiting for a friend") to the third party services 210. For example, the receptionist 402 may decide that the visitor 60 looks suspicious (e.g., wearing a ski mask) and is providing inconsistent answers (e.g., wants to sell something and then says waiting for a friend). The receptionist 402 may select the button 406n that may cause the smart device 102n to generate audio that states that the photo of the visitor 60 has been taken (e.g., "Do not loiter here. Your photo has been taken").

The reactions 420a-420n selected by the receptionist 402 may be uploaded to the cloud service 104. The cloud service 104 may use the reactions 420a-420n, and the audio and video captured by the smart device 102n to train the artificial intelligence model 132. The artificial intelligence model 132 may be used by the smart devices 102a-102n (or the remote device 104) to actively engage with the visitor 60 (e.g., implement conversational AI).

In addition to raising alerts and/or manual reactions selected by the receptionist 402, when the AI model 132 detects possible incidents, a reaction may be communicated to automatically play a series of customized warning messages of increasing severity. For example, the reactions may comprise security features such as increasing loudness of warning messages, sirens, flashing strobe lights, etc. Generally, automated responses may be selected first, before the receptionist 402 intervenes.

As the detected event continues (e.g., the visitor 60 does not leave the area in the video frame 410 in response to the automated responses), the AI model 132 may decide the next reaction should be real-time communication. The real-time communication may be between the receptionist 402 and the visitor 60. The real-time communication with the visitor 60 may streaming audio from the receptionist 402 (or the audio selected using the buttons 406a-406n) via the speaker 360, and receiving the audio responses 422a-422b using the microphone 380. The real-time communication may enable continual engagement until a patrol reaches the site of the event.

Enabling the receptionist 402 to have manual control over various security features of the smart security floodlight 102n may enable the third party services 210 to be located anywhere. For example, the live audio reactions 420a-420c may enable monitoring from patrol cars, from a centralized location (e.g., a call center, from a command center, etc.) and/or by a property owner from anywhere (e.g., from home, from a small office, while on vacation, etc.). The location of the receptionist 402 may be varied according to the design criteria of a particular implementation. Details of the reactions that may be performed and/or the live interventions that may be performed may be described in association with U.S. application Ser. No. 16/792,642, filed on Feb. 17, 2020, appropriate portions of which are hereby incorporated by reference.

In some embodiments, the companion app 160 may enable the monitoring personnel 402 to manually tag events, objects and/or characteristics of the video frame 410. The manual tagging of events, objects and/or characteristics may be implemented in addition to and/or instead of the metadata generated by the processor 112 and/or the AI model 132. The monitoring personnel 402 may flag the event (e.g., the detection of the visitor 60). The event may be included as part of the metadata of the video frames (e.g., the manual tagging may be communicated back to the smart devices 102a-102n and stored with the video data by the storage device 114). In an example, the monitoring personnel 402 may provide a tag input that the visitor 60 has been detected. The monitoring personnel 402 may further provide tag inputs about the characteristics of the visitor 60 (e.g., wearing a ski mask, select the color of the clothes, indicate a male voice was heard in the audio responses 422a-422b, etc.). The monitoring personnel 402 may classify the event (e.g., a burglar was detected, a loiterer was detected, a false alarm was detected, etc.). The monitoring personnel 402 may manually tag the video frame 410 with a transcript of the audio messages 420a-420c, the audio responses 422a-422b and/or other audio heard. The types of tags that may be manually applied by the monitoring personnel 402 that may be included with the metadata may be varied according to the design criteria of a particular implementation.

The example scenario 400 is shown as an example of the third party services 210 intervening to interact with the visitor 60. In some embodiments, the audio messages 410a-420c may be selected using the processor 112 and/or the AI model 132. For example, computer vision operations and/or audio analysis may be implemented to extract information about objects in the video frame 410 (e.g., detect the visitor 60, determine the behavior that indicates that the visitor 60 is attempting to break in through the door 414, determine characteristics of the visitor 60, etc.) and/or parse the audio (e.g., determine that the sound 416 corresponds to glass breaking, interpreting the audio responses 422a-422b to understand what the visitor 60 is communicating) automatically (e.g., without involvement of a person). The processor 112 and/or the AI model 132 may be configured to select the audio messages 420a-420c in response to the scenario detecting using computer vision and/or audio analysis. The processor 112 may be configured to determine when the scenario 400 should be passed off to the third party services 210 (e.g., a potential false positive scenario, a scenario where the processor 112 is unable to determine the event, a potential emergency scenario, etc.).

Figure 7:
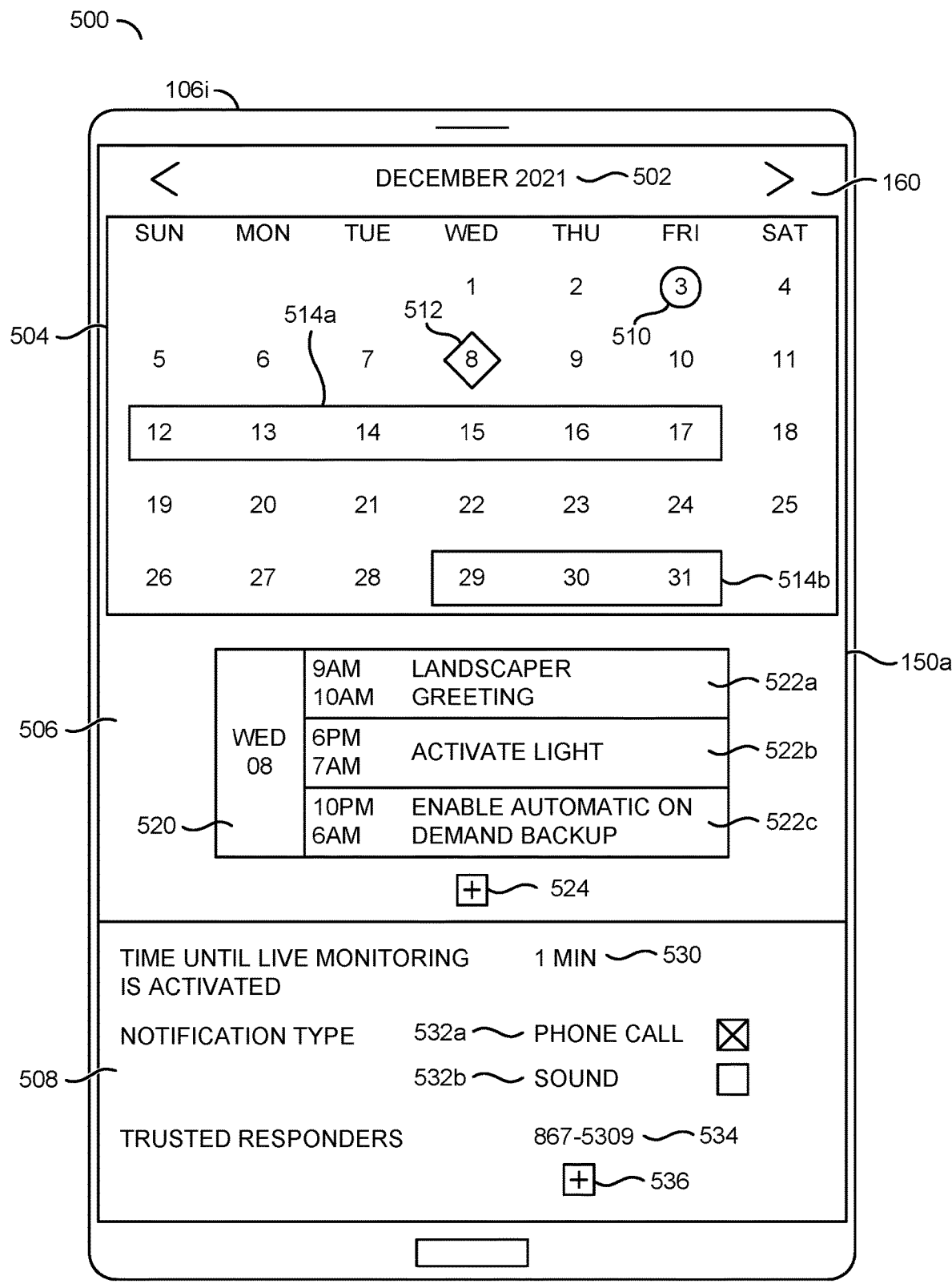
FIG. 7 is a diagram illustrating a user configurable calendar interface for selecting a predetermined time for an automatic on demand backup period.

Referring to FIG. 7, a diagram illustrating a user configurable calendar interface for selecting a predetermined time for an automatic on demand backup period is shown. The companion app 160 may enable the user devices 106a-106n to be configured to display a user editable schedule. In the example shown, the user device 106i may be a smartphone and the editable schedule may be a mobile calendar interface. The example shown of the smartphone user device 106i displaying the mobile calendar interface may be a representative example of the companion application 160 operating on any one of the user devices 106a-106n. The display format of the calendar interface for the companion app 160 may be adaptable to a size of the display of the user devices 106a-106n (e.g., a larger interface with more visible options may be available when the user device is a desktop computer).

The user device 106i is shown comprising the display 150a (e.g., a touchscreen display). The companion app 160 may present output and/or receive input (e.g., touch input) via the display 150a. The companion app 160 may be configured to enable the user to customize various settings for any one of the smart devices 102a-102n. In some embodiments, the various settings may be stored in a cloud-accessible account on the cloud computer service 104 (e.g., the companion app 160 may update the settings stored in the cloud computing service 104, and the smart devices 102a-102n may communicate with the cloud computing service 104 to update the settings used locally). In some embodiments, the various settings may be stored by each of the smart devices 102a-102n (e.g., in the memory 370b and/or the removable storage 114). In an example, some of the settings selected by the user using the companion app 160 may adjust the settings for the automatic on demand backup functionality. The companion app 160 is shown as the mobile calendar interface comprising a month selection 502, an interactive calendar 504, an hourly schedule 506 and/or automatic on demand backup settings 508. The month selection 502 may be used to select which month/year is shown by the interactive calendar 504. In the example shown, the selected month in the month selection 502 may be December 2021 and the interactive calendar 504 may correspond to the days for December 2021. The amount of detail shown for the month selection 502, the interactive calendar 504, the hourly schedule 506 and/or the automatic on demand backup settings 508 may be varied according to the design criteria of a particular implementation.

The interactive calendar 504 may be populated based on locally stored calendar settings and/or internet synchronized calendar settings. The interactive calendar 504 may comprise the various dates for the selected month. An icon 510, an icon 512 and date ranges 514a-514b are shown. The icon 510 may be a current date indicator. The icon 512 may be a selected date indicator. The date ranges 514a-514b may be automatic on demand backup periods. The interactive calendar 504 may comprise other details (e.g., holidays, highlighted birthdays, scheduled appointments, etc.). In some embodiments, the interactive calendar 504 may be populated with scheduled events from an online calendar service (e.g., Google Calendar, Microsoft Outlook, Apple iClound Calendar, etc.). In some embodiments, the interactive calendar 504 may only provide settings that correspond to the smart security lights 102a-102n (e.g., automatic on demand backup period, light schedules, conversational AI schedule, etc.).

In the example shown, the current date indicator 510 may correspond to December 3rd. The current date indicator 510 may highlight the current date. In the example shown, the selected date indicator 512 may correspond to December 8th. The selected date indicator 512 may be changed by the user in response to touch input (e.g., the user may tap the December 8 date). The date highlighted by the selected date indicator 512 may be the date displayed in the hourly schedule 506. For example, the user may tap different dates to change settings in the hourly schedule 506.

The automatic on demand backup periods 514a-514b may be date ranges selected by the user for enabling the automatic on demand backup mode of operation for the smart security lights 102a-102n. In the example shown, one automatic on demand backup period 514a may be a date range from December 12-December 17 and another automatic on demand backup period 514b may be a date range from December 29-December 31. For example, the user may be on vacation during the automatic on demand backup period 514a and may want to temporarily activate the security functionality provided by the automatic on demand backup for a predetermined amount of time (e.g., one week). In another example, the user may be visiting family during the holidays and may select the automatic on demand backup period 514b to enable the additional security features (e.g., enable the additional features only during the specific date range selected).

For the automatic on demand backup periods 514a-514b, the automatic on demand backup mode of operation may be enabled for the smart security lights 102a-102n for the entire time (e.g., 24 hours a day for the selected time range). For example, the automatic on demand backup periods 514a-514b may be suitable for when the user will not be home all day. In some embodiments, the user may individually customize each day within the automatic on demand backup periods 514a-514b by selecting the date with the date selection indicator 512 and adjusting the hourly schedule settings 506. Generally, the user may be charged a fee according to the fee structure for the selected range of time for the automatic on demand backup period 514a-514b (e.g., an hourly fee, a fee of $3 per day, a fee of $15 for a week, etc.). The fee structure applied to the automatic on demand backup periods 514a-514b may be varied according to an amount of time selected.

The hourly schedule settings 506 may comprise a selected date 520, timeslots 522a-522c and/or a new schedule button 524. In the hourly schedule settings 506, the selected date 520 may correspond to the date (e.g., December 8) highlighted by the selected date indicator 512. In embodiments, where the companion app 160 is implemented on one of the user devices 106a-106n with a larger display area, more dates and/or timeslots may be displayed for the hourly schedule settings 506.

The timeslots 522a-522c may comprise hourly scheduled events. In the example shown, the timeslots 522a-522c may be hourly. However other time ranges for the timeslots 522a-522c may be implemented (e.g., 15 minute intervals, half hour intervals, 5 minute intervals, etc.). In the example shown, the timeslot 522a may correspond to a scheduled audio greeting setting (e.g., for an AI doorman feature) between 9 am and 10 am (e.g., a setting to greet a home worker such as a landscaper) and the timeslot 522b may correspond to activating the light 280 between 6 pm and 7 am. In the example shown, the timeslot 522c may correspond to enabling the automatic on demand backup period from 10 μm to 6 am. The scheduled events in the timeslots 522a-522b may not correspond to the automatic on demand backup settings. The new schedule button 524 may enable the user to add new scheduled events (e.g., insert a new timeslot) to the hourly schedule for the selected date 520.

In some embodiments, the calendar interface of the companion app 160 may enable the user to use the calendar for all scheduling purposes (e.g., schedules for work, schedules for dinner plans, a to-do list, schedules for doctor appointments, etc.). For example, the calendar interface may be multi-purpose. In some embodiments, the calendar interface for the companion app 160 may correspond only to features for the smart security lights 102a-102n (e.g., setting the automatic on demand backup periods, setting a schedule for activating/deactivating the light bulb 280, scheduling the arming/disarming of various security features, etc.).

The timeslot 522c for scheduling the automatic on demand backup period may be similar to the date ranges 514a-514b for the automatic on demand backup period. The timeslot 522c may provide a more fine-tuned granularity for selecting the schedule for the automatic on demand backup period. For example, the timeslot 522c may enable an hourly schedule for the automatic on demand backup period. In the example shown, the user may select to schedule the automatic on demand backup features to be enabled overnight. The fee structure may be applied based on the schedule selected. In one example, the fee structure may charge $1 per night for activating the automatic on demand backup features.

The automatic on demand backup settings 508 may comprise various customizations that may be selected by the user for the automatic on demand backup feature. In the example shown, the automatic on demand backup settings 508 may comprise a time limit 530, notifications type selections 532a-532b and/or trusted responders 534. The automatic on demand backup settings 508 may comprise additional options (not shown). The number, type and/or granularity of the automatic on demand backup settings 508 may be varied according to the design criteria of a particular implementation.

The time limit 530 may be a setting that enables the user to select how long that the user has to respond to an emergency alert. For example, if the user does not respond to the emergency alert within the time limit 530, the third party monitoring services 210 may be contacted. A fee may be added to the fee structure if the user is unable to respond to the emergency alert within the time limit 530 (e.g., payment for the services provided by the live monitoring services 210). In the example shown, the time limit 530 may be set to one minute. The time limit 530 may be set to longer or shorter than one minute. For example, a shorter amount for the time limit 530 may ensure that an emergency situation is responded to quickly and a longer amount of time may ensure that the user has more time to manually respond to an emergency alert. A common usage scenario may be that the emergency alert awakens the user in the middle of the night due to a break in detected by the smart security lights 102a-102n and the user may want more than one minute to awaken, find the user device 106i and make a decision on whether to contact the authorities 212 in response to the emergency alert. The notifications type selections 532a-532b may comprise options for how the emergency alert may be communicated. The notification type selection 532a may comprise a phone call. In an example, the phone call may use a ring tone of the user device 106i to contact the user when an emergency is detected. The phone call may override do not disturb settings of the user device 106i. In another example, the phone call may be an automated voice message (e.g., a pre-recorded message about the alert and/or a procedurally generated voice message describing the nature of the emergency). The notification type selection 532b may comprise a sound. In an example, the sound may comprise a series of loud audio alerts that may override do not disturb settings of the user device 106i. Other types of emergency alerts may be selected (e.g., strong vibration, flashing strobe light using a smartphone camera flash, playing audio from Wi-Fi connected speakers, etc.).

The trusted responders 534 may comprise a list of contacts that may be contacted and/or informed if the user does not respond to the emergency alert within the time limit 530. In the example shown, one phone number is listed. In some embodiments, a contact name or identifier may be listed (e.g., in case the user changes the phone number of the contact in the phone settings). A new contact button 536 is shown. The new contact button may enable the user to add additional contacts to the trusted responders 534. The trusted responders 534 may be neighbors, friends, family members, etc. The trusted responders 534 may be contacted as an alternate to contacting the live monitoring services 210 and/or the authorities 212. For example, first contacting the trusted responders 534 may have a lower cost applied to the fee structure than contacting the live monitoring services 210. In one example, trusted responders 534 may be contacted at no additional fee.

Figure 8:
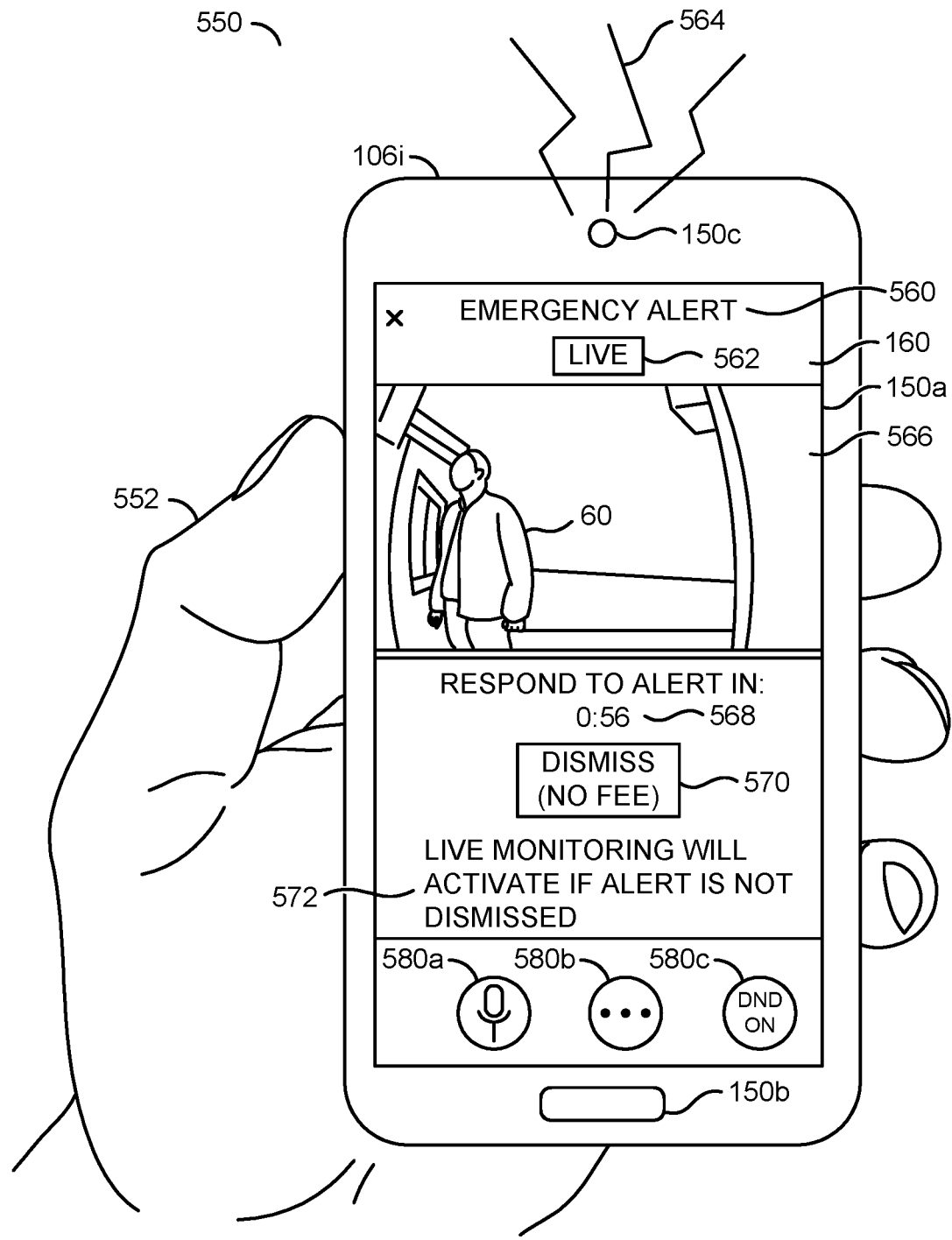
FIG. 8 is a diagram illustrating a user device implementing an app for video streams and emergency alerts.

Referring to FIG. 8, a diagram illustrating a user device implementing an app for video streams and emergency alerts is shown. An example context 550 of the invention is shown. In the example context 550, the user device 106i is shown held by a user 552 (e.g., a homeowner). For example, the user device 106i may be a portable (e.g., handheld) device (e.g., the smartphone 106b shown in association with FIG. 2). In the example shown, the user device 106i may be a smartphone implementing the companion app 160.

The smartphone 106i is shown having the display 150a, a microphone 150b and/or a speaker 150c. In an example, the display 150a may be a touchscreen display enabling the user 552 to view output from the smartphone 106i and/or provide input (e.g., touch controls) to the smartphone 106i. The microphone 150b may receive audio. The speaker 150c may playback audio. In an example, the speaker 150c and the microphone 150b may enable the visitor 60 to interact with the smart camera lights 102a-102n as a two-way intercom with the user 552. In one example, the speaker 150c on the smartphone 106i may playback the audio input 144 captured by the microphone component 380 and wirelessly transmitted by the smart camera 102i. In another example, the microphone 150b on the smartphone 106i may capture audio (e.g., speech from the user 552) that may be wirelessly transmitted to the smart camera 102i and the smart camera 102i may playback the audio using the speaker component 360 (e.g., playback one of the audio messages 420a-420c shown in association with

FIG. 6).

In the example shown, the companion app 160 shown on the smartphone 106i may display an example emergency alert 560. The emergency alert 560 may be generated in response to the detection of an event by the smart camera lights 102a-102n. For example, the processor 112 and/or the neural network AI model 132 may detect an event and determine that the event is an emergency. In one example, the event may be the detection of a burglar (e.g., classifying the visitor 60 as someone who is or might break into the home). In another example, the event may be the detection of a loiterer (e.g., a person that refuses to leave the property even after the audio messages 420a-420c have instructed the visitor 60 to leave). In yet another example, the event may be the detection of property damage (e.g., the microphone 380 may capture the sound of breaking glass that may not have been captured in video, the video analysis may detect a fire, the video analysis may detect flooding, etc.). The type of detection that corresponds to an event that may be used to generate the emergency alert 560 may be varied according to the design criteria of a particular implementation.

The emergency alert 560 provided by the companion app 160 may comprise a live video stream 562 and/or an audio alert 564. The live video stream 562 may comprise a display of the video frames 566. The audio alert 564 may comprise a very loud noise generated from the speaker 150c.

The audio alert 564 may correspond to the notification types 532a-532b selected as shown in association with FIG. 7. In an example the audio alert 564 may be a very loud sound. The purpose of the audio alert 564 may be to ensure the user 552 becomes aware of the emergency alert 560. In one example, the user 552 may be sleeping while on vacation and the audio alert 564 may be generated to wake up the user 552 so that the user 552 becomes aware of the emergency alert 560. In another example, the user 552 may be at a loud event (e.g., a wedding reception, a concert, a convention, working in a factory, etc.) and the audio alert 564 may be generated to ensure that the user 552 can hear the emergency alert 560 over the ambient noise. The audio alert 564 may be played for the length of the time limit 530.

The video frames 566 may comprise a view of the field of view 108a captured by the camera module 324 of one or more of the smart camera lights 102a-102n. In the example shown, the visitor 60 may be in the video frames 566. The video frames 566 may provide the user 552 with context about the emergency alert 560. The video frames 566 may enable the user to view the event that has been detected by the smart camera lights 102a-102n. The user 552 may decide how to respond to the emergency alert 560 (e.g., whether or not to contact the authorities 212, contact one of the trusted responders 534, dismiss the emergency alert 560, etc.) after viewing the video frames 566.

The video frames 566 may correspond with the video stream generated by the processor 112 in response to the pixel data captured by the image sensor 382. For example, the smart camera lights 102a-102n may be configured to wirelessly communicate (e.g., a live stream and/or send a recorded file stored on the removable storage 114 for later playback) the video stream(s) to the smartphone 106i using the communication device 370a. The companion application 160 may receive the video stream and playback the video frames 566. In the example shown, one set of video frames 566 are shown (e.g., video from one of the smart security lights 102a-102n). In some embodiments, the companion app 160 may be configured to display video frames received from multiple of the smart camera lights 102a-102n simultaneously. For example, the display of multiple video streams using the companion app 160 may be described in association with U.S. application Ser. No. 17/164,595, filed on Feb. 1, 2020, appropriate portions of which are incorporated by reference.

The companion app 160 for the emergency alert 560 may comprise a response countdown 568, a button 570 and a notice 572. The response countdown 568 may provide a live, updating timer. The button 570 may provide a dismiss option for the emergency alert 560. The notice 572 may provide information to the user 552 about the emergency alert 560. The companion app 160 for the emergency alert 560 may comprise other features and/or graphical elements (not shown). The design and/or layout of the emergency alert 560 may be varied according to the design criteria of a particular implementation.

The response countdown 568 may be a countdown timer that indicates how long the user 552 has to manually respond (or dismiss) the emergency alert 560. The response countdown 568 may count downwards from the time limit 530 setting shown in association with FIG. 7. In the example shown, the respond countdown 56 may indicate 56 seconds are left to manually respond to the emergency alert 560. For example, time limit 530 may be set to two minutes and the response countdown 568 may countdown from two minutes.

The dismiss button 570 may provide an input to enable the user 552 to dismiss (or otherwise manually respond) to the emergency alert 560. The dismiss button 570 is shown indicating that no fee may apply if the user manually dismisses the emergency alert 560. The no fee indication is shown as a representative example (e.g., the dismiss button 570 may not display that no fee will apply). When the user 552 interacts with the dismiss button 570, the emergency alert 560 may be stopped, the audio alert 564 may stop and the response countdown 568 may stop.

The notice 572 may provide an indication that dismissing the emergency alert 560 before the response countdown 568 ends may prevent the live monitoring service 210 from intervening. Generally, the live monitoring service 210 may intervene (e.g., as shown in association with FIG. 6) if the user 552 does not manually respond to the emergency alert 560. The fee structure implemented by the system 100 may result in a monetary charge to the user 552 if the live monitoring service 210 intervenes. If the user 552 does dismiss the emergency alert 560, then the fee may not be charged.

The user 552 may dismiss the emergency alert 560 by activating the dismiss button 570. For example, the user 552 may view the video frames 566, see that the visitor 60 is a friendly visitor. The user 552 may decide that contacting the authorities 212 or having the live monitoring service 210 intervene is unnecessary for the friendly visitor. In some embodiments, the companion app 160 may provide manual response options after the user 552 dismisses the emergency alert 560. The response options may enable the user 552 to manually respond to the detected event. For example, one of the response options may be to enable the two-way audio communication. For example, the user 552 may dismiss the emergency alert 560 and decide to manually respond to the visitor 60 by starting a conversation. In another example, the user 552 may dismiss the emergency alert 560 and one of the response options may be to unlock the front door (e.g., the user 552 may know the visitor 60 and want them to enter the premises). In yet another example, the user 552 may dismiss the emergency alert 560 and one of the response options may be to sound an alarm (e.g., using the speaker 360 of the smart security lights 102a-102n) to attempt to scare away the visitor 60. In still another example, the user 552 may dismiss the emergency alert 560 and one of the response options may be to directly contact the authorities 212 (e.g., the user 552 may confirm that the emergency alert 560 is actually an emergency and may not want to wait for the response countdown 568 to elapse and wait for the live monitoring service 210 to intervene before action is taken). The types of manual responses to the emergency alert 560 available to the user 552 may be varied according to the design criteria of a particular implementation.

In some embodiments, the companion app 160 may provide feedback to the AI model 132 in response to the user 552 selecting the dismiss button 570. For example, one of the response options available to the user 552 may be to flag the emergency alert 560 as a false positive. Flagging the emergency alert 560 as a false positive may provide negative feedback to the AI model 132, which may be used by the AI model 132 to continually learn which types of events are emergencies and which types of events are not emergencies. Similarly, if the user 552 (or the live monitoring service 210 after intervening) indicates that the emergency alert 560 was properly detected, positive feedback may be provided to the AI model 132.

In the example shown, the companion app 160 may further comprise controls 580a-580c. The controls 580a-580c may enable access to and/or indicate a status of various features of the companion app 160 and/or the operating system of the user device 106i. In an example, the control 580a may enable the user 552 to communicate with the visitor 60 using the two-way communication. In another example, the control 580c may provide an indication that the Do Not Disturb mode for the user device 106i is activated. For example, even when the Do Not Disturb mode 580c is on, the emergency alert 560 may enable the audio alert 564 to be generated (e.g., the companion app 160 may override the Do Not Disturb Mode 580c for the user device 106i during the automatic on demand backup mode of operation). In the example shown, the user device 106i may be a smartphone. In some embodiments, the user device 106i may be a smart home device. For example, the user device 106i may be a voice command operated device without video playback capabilities (e.g., a Google Home device, an Amazon Alexa, etc.). In embodiments, where the user device 106i does not comprise the touchscreen display 150a, the companion app 160 may be implemented as a conversational application (e.g., an Alexa Skill). In an example of a conversational application implementation, the emergency alert 560 may be provided without the video frames 566. The conversational application implementation may provide the loud audio alert 564. In some embodiments, the loud audio alert 564 may comprise a description of the detected emergency. For example, the processor 112 may be configured to perform the computer vision operations to detect and/or classify the event and translate the detected to an audio output. In one example, the processor 112 and/or the AI model 132 may classify the visitor 60 as a burglar, provide an audio description as part of the audio alert 564 (e.g., "A burglar has been detected at your home"). In another example, the processor 112 and/or AI model 132 may classify the detected event as a fire and the description of the event may be provided as part of the audio alert 564 (e.g., "A fire has been detected on your property").

In embodiments, where the companion app 160 is implemented as a conversational application, the user 552 may dismiss the emergency alert 560 by providing a voice command. For example, the user 552 may speak a command (e.g., "Dismiss alert") to prevent the companion app 160 from allowing the live monitoring service 210 to intervene. In another example, the user 552 may speak a command (e.g., "Call the fire department") to dismiss the alert and allow a selected response to be performed. The type of voice commands used and/or the available options for responding to the emergency alert 560 using the conversational application may be varied according to the design criteria of a particular implementation.

In the example shown, the companion app 160 may generate the emergency alert 560 during the automatic on demand backup mode of operation. For example, the user 552 may select when the system 100 operates in the automatic on demand backup mode of operations by configuring the calendar interface (e.g., to select the time ranges 514a-514b and/or the timeslots 522c). The companion app 160 may be further configured to provide notifications (e.g., notifications for events that are not determined to be emergencies). The user 552 may customize preferences using the companion app 160 for which types of events provide notifications (e.g., an animal is detected on the property, a car has pulled into the driveway, a child has returned home from school, etc.). The notifications to other events may be provided when the system 100 is not operating in the automatic on demand backup mode of operation. The notifications to other events may also be provided during the automatic on demand backup mode of operations but may not override the Do Not Disturb mode 580c of the user device 106i. The types of events that are determined to not be emergencies but may result in a notification being generated may be varied according to the design criteria of a particular implementation.

The companion app 160 may be configured to send notifications in response to the detections performed by the processor 112 and/or the AI model 132. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user 552 may create a user account (e.g., comprising at least an email address and a password as credentials) for the cloud service 104 (e.g., via an app and/or a web-based interface). The user account may allow the user 552 to configure preferences. The preferences may comprise the notification settings. The type of notifications sent by the smart cameras 102a-102n may be based on the notification settings. In an example, the notification may provide an indication of when a package has been delivered.

Figure 9:
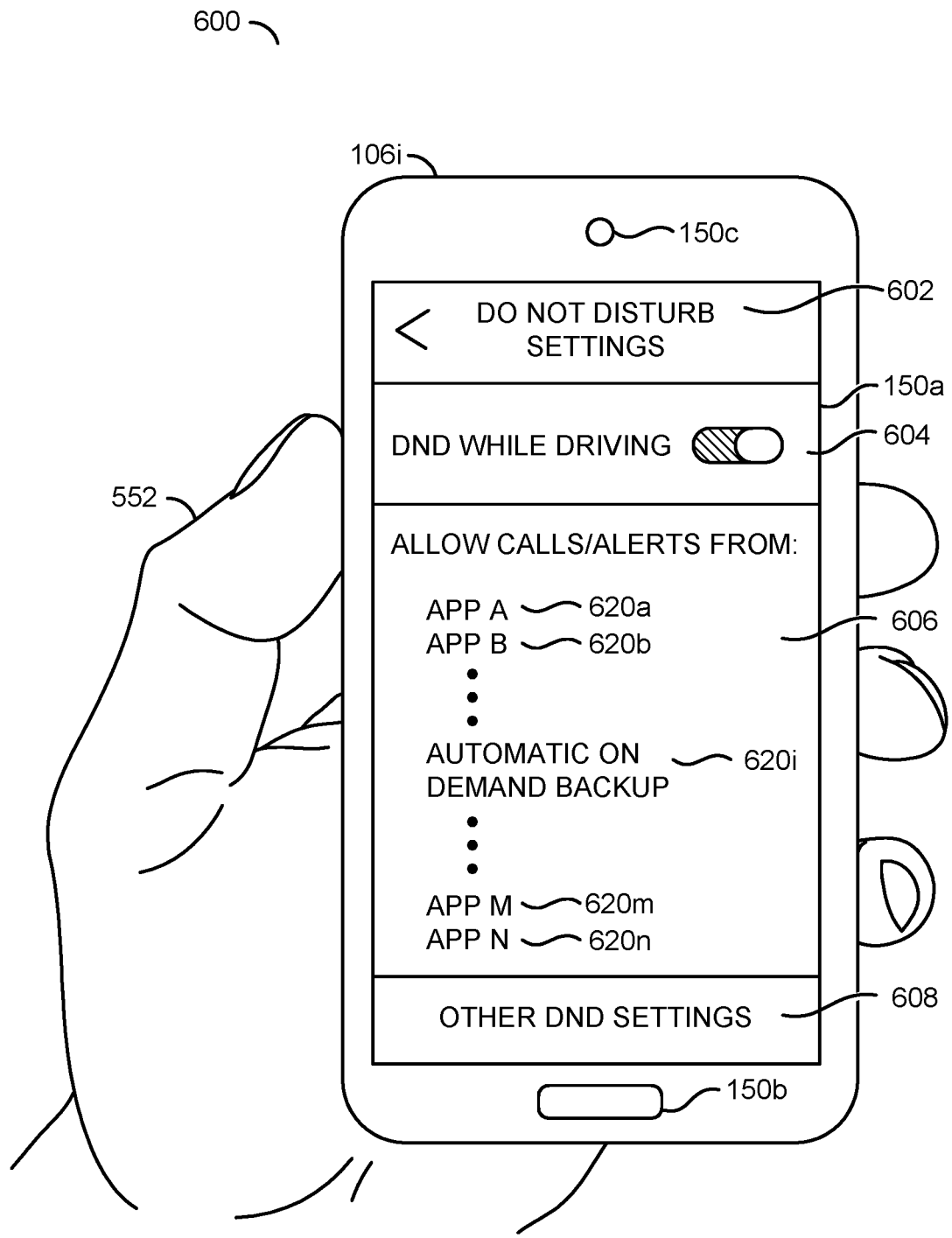
FIG. 9 is a diagram illustrating do not disturb settings for a user device.

Referring to FIG. 9, a diagram illustrating do not disturb settings for a user device is shown. An example context 600 of the invention is shown. The user device 106i is shown in the example context 600. The user device 106i may be similar to the user device 106i shown in association with FIG. 8. The user device 106i is shown being held by the user 552. The user device 106i may comprise the touchscreen display 150a, the microphone 150b and/or the speaker 150c.

Do Not Disturb settings 602 are shown on the touchscreen display 150a. The Do Not Disturb settings 602 may be a setting provided at an operating system level for the user devices 106a-106n. The Do Not Disturb settings 602 may provide customizable preferences for the Do Not Disturb mode 580c. For example, the Do Not Disturb settings 602 may not be part of the companion app 160. The Do Not Disturb settings 602 may enable the user 552 to customize how the user devices 106a-106n handle the companion app 160 and/or the automatic on demand backup mode of operation of the system 100.

The Do Not Disturb settings 602 may comprise driving settings 604, an exception list 606 and/or other settings 608. The driving settings 604 and/or the other settings 608 may be other customizations that may be offered based on the particular type of the user devices 106a-106n.

The exception list 606 may comprise a list of applications 620a-620n. The list of applications 620a-620n may comprise apps installed on the user device 106i that the user 552 has selected that may be able to override the Do Not Disturb mode 580c. For example, alarms may be one type of app that may be selected to override the Do Not Disturb mode 580c in order to be useful. Apps installed on the user device 106i that are not listed in the exception list 606 may not be capable of overriding the Do Not Disturb mode 580c. For example, the Do Not Disturb mode 580c may suppress all notifications, sounds and/or vibrations of the user device 106i.

The automatic on demand backup 620i is shown as one of the applications 620a-620n in the exception list 606. In one example, the user 552 may manually add the automatic on demand backup 620i to the exception list 606. In another example, the automatic on demand backup 620i may be added to the exception list 606 based on an approved permission from the user 552 when the companion app 160 is installed.

Adding the automatic on demand backup 620i (or the companion app 160) to the exception list 606 may enable the emergency alert 560 to be generated even when the user device 106i is in the Do Not Disturb mode 580c. Allowing the automatic on demand backup 620i to override the Do Not Disturb mode 580c may ensure that all emergency alerts are received. For example, a common scenario may be that an emergency is detected while the user 552 is asleep. To prevent interruptions from the various alerts and/or phone calls that smartphones receive, the user 552 may activate the Do Not Disturb mode 580c while sleeping. Unless the automatic on demand backup 620i (or the companion app 160) is added to the exception list 606, the emergency alert 560 would not be able to be generated while the user device 106i is in the Do Not Disturb mode 580c.

In some embodiments, the companion app 160 may be added to the exception list 606. In some embodiments, the companion app 160 may provide granularity for selecting which features may be added to the exception list 606. For example, the user 552 may not want all notifications from the companion app 160 to override the Do Not Disturb mode 580c, but may want only the emergency alert 560 to override the Do Not Disturb mode 580c. In one example, the user 552 may not want a notification about a cute animal detected by the processor 112 to override the Do Not Disturb mode 580c, but may want an alert of a fire to override the Do Not Disturb mode 580c. Which features or combinations of features of the companion app 160 may be added to the exception list 606 may be varied according to the design criteria of a particular implementation.

Figure 10:
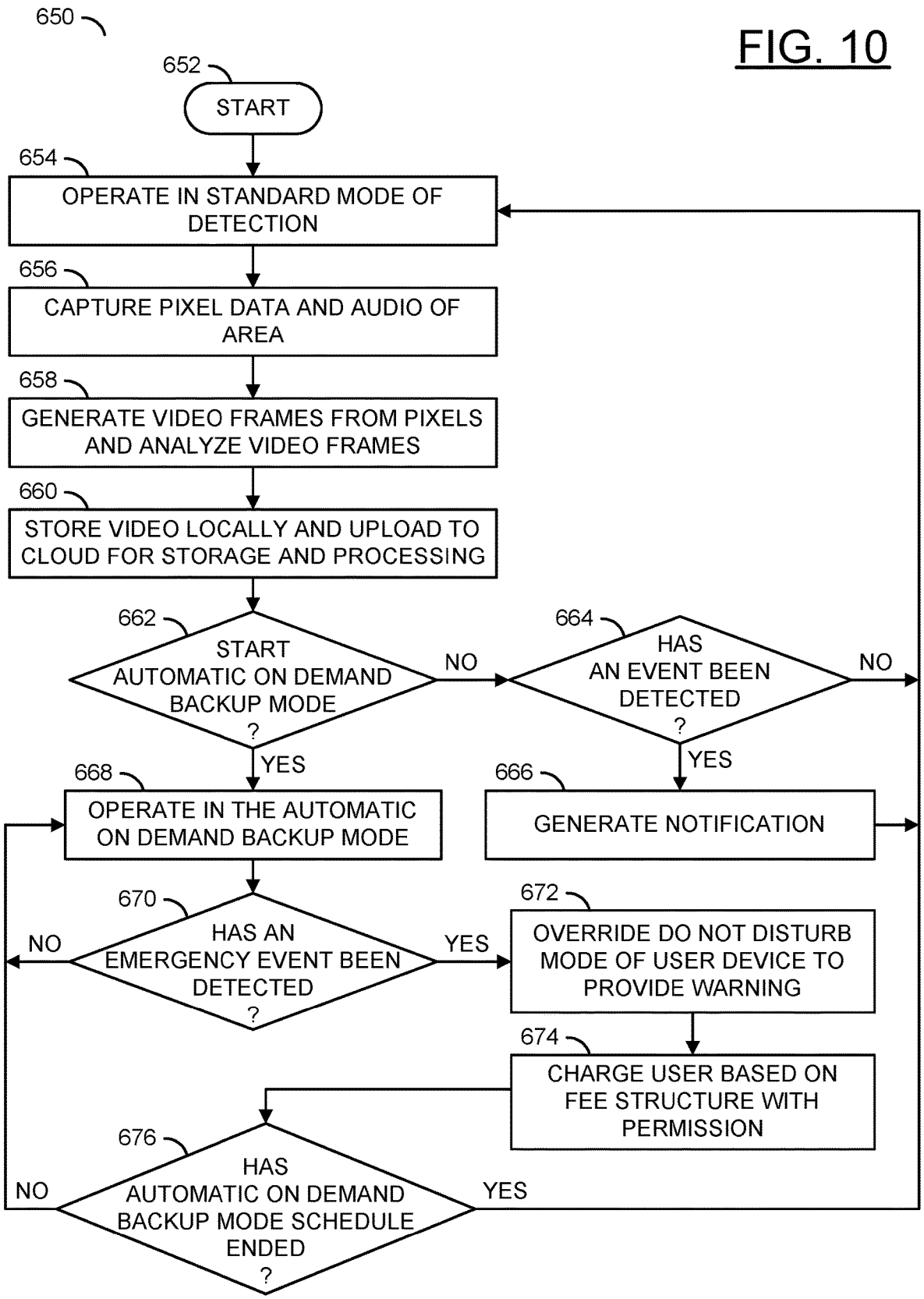
FIG. 10 is a flow diagram illustrating a method for implementing automatic on demand backup to do-it-yourself remote monitoring.

Referring to FIG. 10, a method (or process) 650 is shown. The method 650 may implement automatic on demand backup to do-it-yourself remote monitoring. The method 650 generally comprises a step (or state) 652, a step (or state) 654, a step (or state) 656, a step (or state) 658, a step (or state) 660, a decision step (or state) 662, a decision step (or state) 664, a step (or state) 666, a step (or state) 668, a decision step (or state) 670, a step (or state) 672, a step (or state) 674, and a decision step (or state) 676.

The step 652 may start the method 650. In the step 654, the smart camera lights 102a-102n may operate in a standard mode of operation. In an example, the standard mode of operation may detect events and/or provide notifications to the user devices 106a-106n. Next, in the step 656, the capture device (e.g., the camera module 324) may capture pixel data and/or audio of the area. In the step 658, the processor 112 may generate the video frames from the pixel data and analyze the video frames to detect objects. In an example, the processor 112 may perform computer vision operations on the video frames (e.g., analyze the video frame 410). Next, in the step 660, the removable storage 114 may locally store the video frames and/or the communication module 370a may upload the video frames to the cloud computing service 104 for storage and/or processing. Next, the method 650 may move to the decision step 662.

In the decision step 662, the processor 112 may determine whether the smart security device 102i should start the automatic on demand backup mode. In an example, the processor 112 for each of the smart security devices 102a-102n may compare a current time to a schedule set according to the interactive calendar 504 of the companion app 160. In one example, the calendar settings may be stored in the removable storage 114, the memory 370b and/or accessed in the distributed storage 120a-120b of the cloud computing service 104. If the smart security device 102i is not starting the automatic on demand backup mode of operation, then the method 650 may move to the decision step 664.

In the decision step 664, the processor 112 (or the distributed servers 122a-122n using the neural network AI 132) may determine whether an event has been detected. In an example, the event may be a detection of a loud noise, the detection of a person, the detection of audio, movement in the video frames, etc. If no event has been detected, then the method 650 may return to the step 654. If an event has been detected, then the method 650 may move to the step 666. In the step 666, the communication module 370a may generate a notification for the user devices 106a-106n. In an example, the user may manually respond to the notification, view the video stream, ignore the notification, etc. Next, the method 650 may return to the step 654.

In the decision step 662, if the smart security device 102i is starting the automatic on demand backup mode of operation, then the method 650 may move to the step 668. In the step 668, the smart security device 102i may operate in the automatic on demand backup mode of operation. Generally, for a particular one of the premises 202a-202n, each of the smart security devices 102a-102n implemented may change mode of operation at the same time. Next, the method 650 may move to the decision step 670.

In the decision step 670, the processor 112 (or the neural network AI 132) may determine whether an emergency event has been detected. If no emergency event has been detected, then the method 650 may return to the step 668. If an emergency event has been detected, then the method 650 may move to the step 672. In the step 672, the communication module 370a may generate an alert that may override the do not disturb mode 580c of the user devices 106a-106n to provide a warning. Next, in the step 674, the user 552 may be charged based on a fee structure with permission. For example, the cloud computing service 104 may track billing information for each user. Depending on the fee structure that the user 552 has given permission (e.g., agreed) to use, the user 552 may be charged the fee for the alert or for particular responses to the alert (e.g., if the user manually responds, there may be no charge to the user). Next, the method 650 may move to the decision step 676.

In the decision step 676, the processor 112 may determine whether the smart security device 102i should end the automatic on demand backup mode. The processor 112 may determine whether to end the automatic on demand backup mode of operation similar to determining whether to start the automatic on demand back up mode (e.g., based on the calendar information). If the automatic on demand backup mode is not determined to end, then the method 650 may return to the step 668. If the automatic on demand backup mode is determined to end, then the method 650 may return to the step 654.

Figure 11:
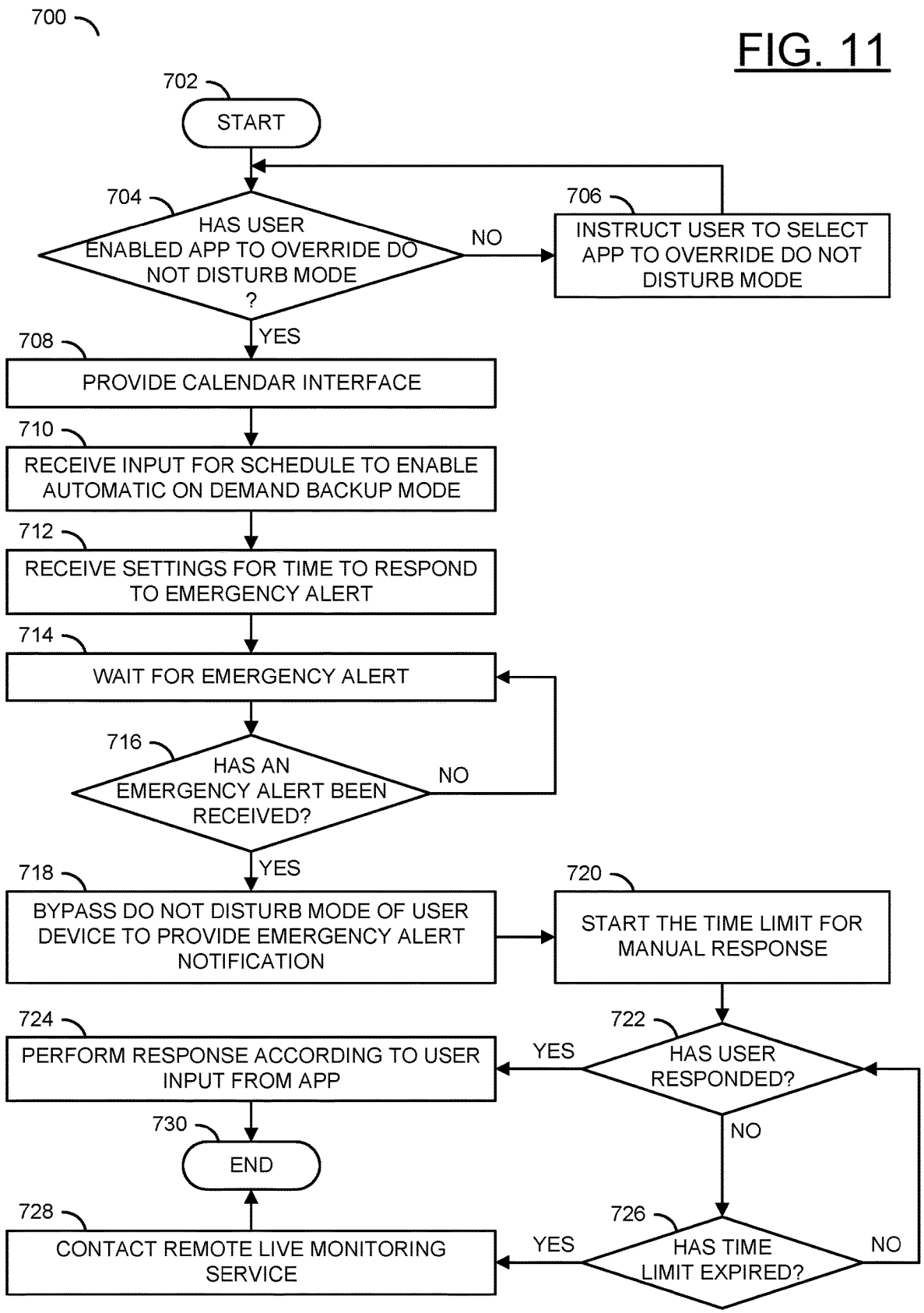
FIG. 11 is a flow diagram illustrating a method for generating an alert in response to detecting an emergency.

Referring to FIG. 11, a method (or process) 700 is shown. The method 700 may generate an alert in response to detecting an emergency. The method 700 generally comprises a step (or state) 702, a decision step (or state) 704, a step (or state) 706, a step (or state) 708, a step (or state) 710, a step (or state) 712, a step (or state) 714, a decision step (or state) 716, a step (or state) 718, a step (or state) 720, a decision step (or state) 722, a step (or state) 724, a decision step (or state) 726, a step (or state) 728, and a step (or state) 730.

The step 702 may start the method 700. Next, the method 700 may move to the decision step 704. In the decision step 704, the app 160 may determine whether the user 552 has enabled the app 160 to override the do not disturb mode 580c (as shown in association with FIG. 9). In an example, the app 160 may check the various permissions enabled for the user device 106i. If the app 160 has not been given permission to override the do not disturb mode 580c, then the method 700 may move to the step 706. In the step 706, the app 160 may instruct the user 552 to select the app 160 in the exception list 606 to override the do not disturb mode 580c. Next, the method 700 may return to the decision step 704.

In the decision step 704, if the app 160 has been given permission to override the do not disturb mode 580c, then the method 700 may move to the step 708. In the step 708, the app 160 may provide the calendar interface 504. Next, in the step 710, the app 160 may receive input for a schedule for enabling the automatic on demand backup mode of operation. In the step 712, the app 160 may receive input for the automatic on demand backup settings 508. For example, the app 160 may receive settings for the time limit 530 to select the predetermined amount of time for the user 552 to respond to an emergency alert. Next, in the step 714, the app 160 may wait (e.g., operate in an idle mode) for an emergency alert to be sent by one or more of the smart security lights 102a-102n. Next, the method 700 may move to the decision step 716.

In the decision step 716, the app 160 may determine whether an emergency alert has been received. In an example, the app 160 may receive a signal initiated by the communication module 370a from one or more of the smart security lights 102a-102n that detected the emergency event. If no emergency alert has been received, the method 700 may return to the step 714. If an emergency event has been detected, then the method 700 may move to the step 718.

In the step 718, the app 160 may bypass the do not disturb mode 580c of the user device 106i to provide the emergency alert notification 560. Next, in the step 720, the app 160 may start counting down the time limit counter 568 from the value set for the time limit 530. Next, the method 700 may move to the decision step 722.

In the decision step 722, the app 160 may determine whether the user 552 has responded. In an example, the user 552 may respond by interacting with the button 570 (e.g., dismissing the alert and/or providing additional input). If the user 552 has responded to the emergency alert 560, then the method 700 may move to the step 724. In the step 724, the app 160 may communicate the response to the emergency alert 560 by the user 552 to the smart security lights 102a-102n, the cloud computing service 104, the remote monitoring service 210 and/or the authorities 212. Next, the method 700 may move to the step 730. In the decision step 722, if the user 552 has not responded, then the method 700 may move to the decision step 726.

In the decision step 726, the app 160 may determine whether the time limit counter 568 has expired. If the time limit counter 568 has not expired, then the method 700 may return to the decision step 722. If the time limit counter 568 has expired, then the method 700 may move to the step 728. In the step 728, the app 160 may contact the remote live monitoring service 210. Next, the method 700 may move to the step 730. The step 730 may end the method 700.

Figure 12:
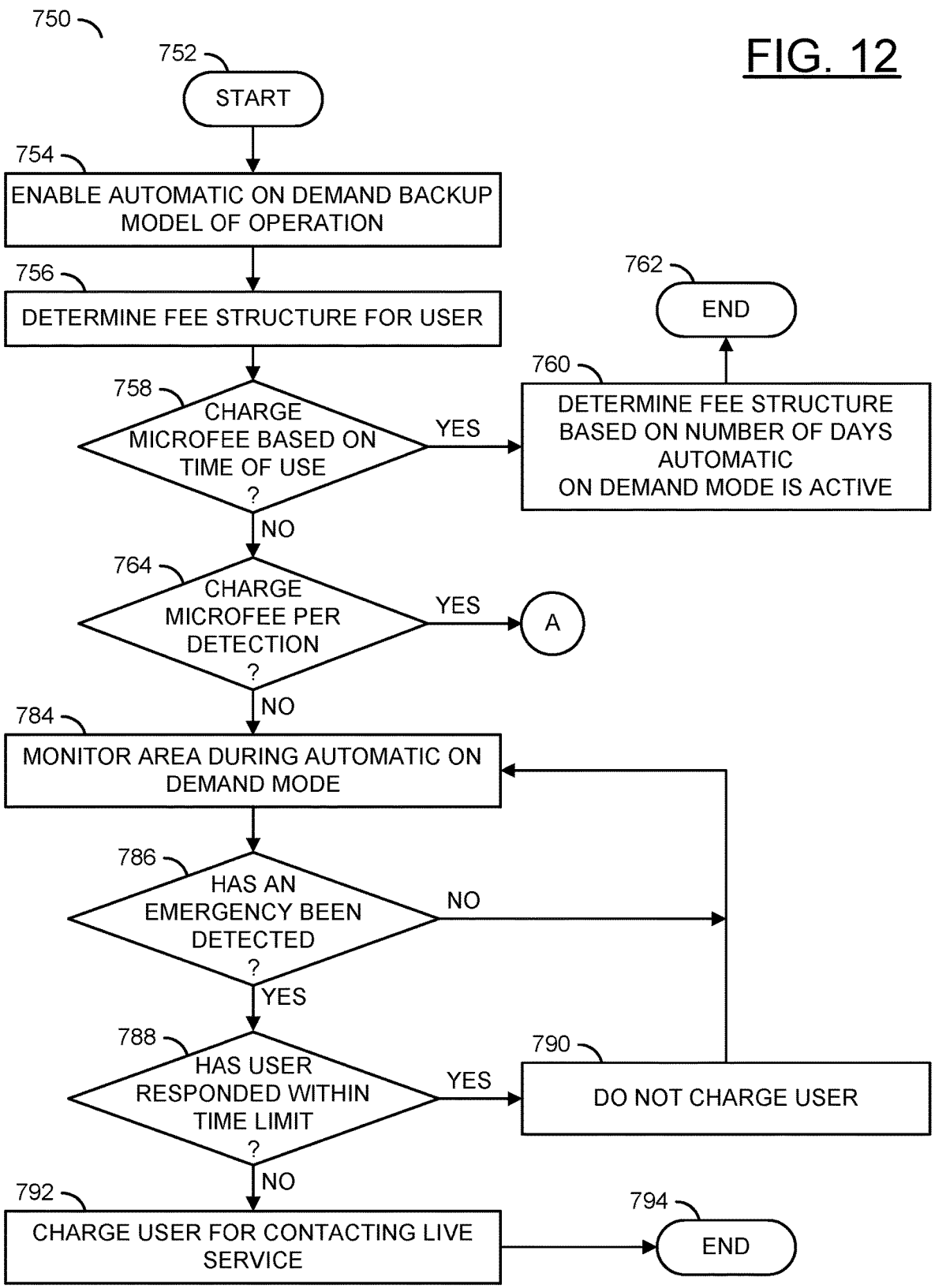
FIG. 12 is a flow diagram illustrating a method for charging a fee structure based on a service type.
Figure 13:
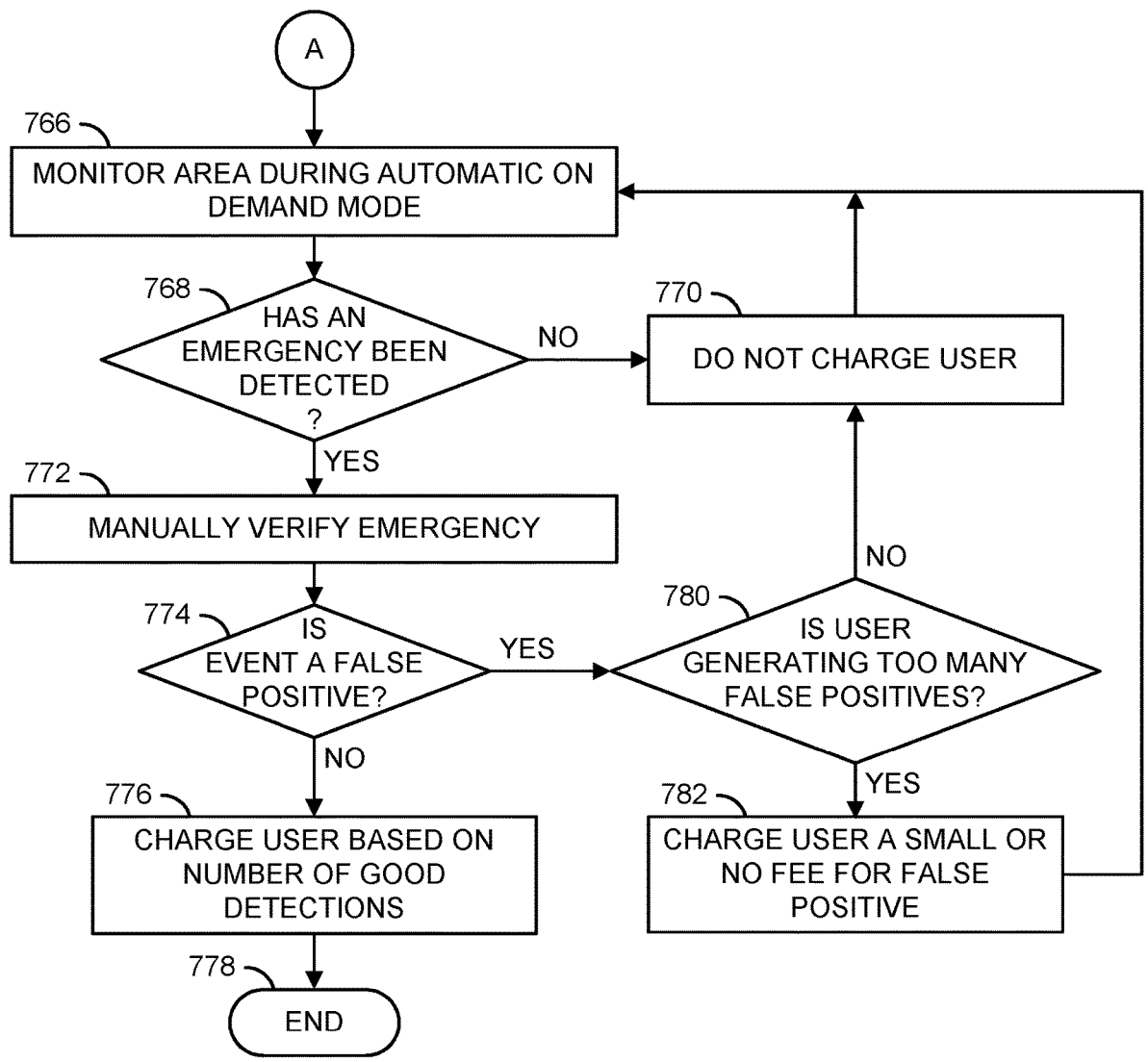
FIG. 13 is a flow diagram illustrating a method for charging a fee structure based on a service type.

Referring to FIG. 12 and to FIG. 13, a method (or process) 750 is shown. A portion of the method 750 is shown in FIG. 12 and a portion of the method 750 is shown in FIG. 13. The method 750 may charge a fee structure based on a service type. The method 750 generally comprises a step (or state) 752, a step (or state) 754, a step (or state) 756, a decision step (or state) 758, a step (or state) 760, a step (or state) 762, a decision step (or state) 764, a step (or state) 766, a decision step (or state) 768, a step (or state) 770, a step (or state) 772, a decision step (or state) 774, a step (or state) 776, a step (or state) 778, a decision step (or state) 780, a step (or state) 782, a step (or state) 784, a decision step (or state) 786, a decision step (or state) 788, a step (or state) 790, a step (or state) 792, and a step (or state) 794.

The step 752 may start the method 750. In the step 754, the smart security devices 102*a*-102*n* may enable the automatic on demand backup mode of operation. Next, in the step 756, a fee structure for the user 552 may be determined. Next, the method 750 may move to the decision step 758.

The fee structure may be tracked by the app 160 and/or by the database 216. In an example, the fee structure may be implemented by a provider of a service that implements the system 100 (e.g., provides the smart security devices 102*a*-102*n*, contracts with the remote live monitoring services 210, provides the app 160, etc.). Each user may purchase services based on various fee structures. For example, some users may select a free service (e.g., only receive notifications with no additional services), some users may select a premium service subscription plan (e.g., the remote monitoring service 210 may be provided as part of the premium service subscription plan), some users may select microcharges for the automatic on demand backup mode, etc. The types of fee structures available to the end users may be varied according to the design criteria of a particular implementation.

In the decision step 758, the system 100 and/or the app 160 may determine whether the user 552 has selected to be charged a microfee based on time of use for the automatic on demand backup mode. If the user 552 has selected the fee structure based on time of use, then the method 750 may move to the step 760. In the step 760, the system 100 may determine the fee structure based on the number of days (or hours) that the automatic on demand mode is active. In one example, the system 100 may be provided for free, and the fee structure may charge monetary fees for each day (or hour) that the date ranges 514*a*-514*b* (or the timeslots 522*a*-522*c*) that the user 552 has selected the automatic on demand backup mode to be active. For example, the user 552 may be charged based on time of use regardless of whether any events have been detected or any response has been performed. Additional fees may apply if the user 552 does not respond to the emergency alert 560 and the remote live monitoring service 210 is contacted. Next, the method 750 may move to the step 762. The step 762 may end the method 750.

In the decision step 758, if the user 552 has not selected the fee structure based on time of use, then the method 750 may move to the decision step 764. In the decision step 764, the system 100 and/or the app 160 may determine whether the user 552 has selected to be charged a microfee per detection performed in the automatic on demand backup mode of operation. If the user 552 has selected the fee structure based on the microfee per detection, then the method 750 may move to the step 766. The steps 766-782 may be shown in association with FIG. 13.

In the step 766, the smart security devices 102*a*-102*n* may monitor the area (e.g., one or more of the premises 202*a*-202*n*) while in the automatic on demand mode of operation. Next, the method 750 may move to the decision step 768. In the decision step 768, the processor 112 (or the neural network AI model 132) may determine whether an emergency event has been detected. If no emergency event has been detected, then the method 750 may move to the step 770. In the step 770, the user 552 may not receive a charge for the fee structure (e.g., no per-incident fee because no incident was detected). Next, the method 750 may return to the step 766. In the decision step 768, if an emergency event has been detected, then the method 750 may move to the step 772. In the step 772 a person (e.g., the security personnel 402) may manually verify the emergency. In an example, the emergency alert 560 may have been provided to the user devices 106*a*-106*n*, and the security personnel 402 may review the emergency event afterwards (e.g., by reviewing the video frames (e.g., the video frame 410) and/or audio 144 of the event communicated by the smart security devices 102*a*-102*n* to the storage servers 120*a*-120*n*). Next, the method 750 may move to the decision step 774.

In the decision step 774, the security personnel 402 may determine whether the detected emergency event was a false positive. For example, the security personnel 402 may review the data that the emergency alert 560 was based on (e.g., the captured video frames and audio) and determine if the processor 112 and/or the neural network AI 132 correctly determine that the emergency did occur (e.g., whether a fire detected was actually a fire, whether a burglar detected was actually a burglar, etc.). If the emergency event is determined to be a false positive, the method 750 may move to the decision step 780.

In the decision step 780, the system 100 may determine whether the user 552 (e.g., the smart security devices 102*a*-102*n* at the premises 202*a*-202*n* associated with one user) is generating too many false positives. For example, a poor environment and/or settings for detections for the smart security devices 102*a*-102*n* may result in too many false positives (e.g., the user 552 should re-calibrate the settings to avoid false positives). Since each false positive is manually verified, the provider of the system 100 may be abused and/or incur a high cost for manually verifying too many emergencies. The number of false positives determined to be too many may be varied according to the design criteria of a particular implementation and/or individual circumstances. If the user 552 does not have too many false positives, then the method 750 may move to the step 770 (e.g., no charge because the detected emergency was not a proper detection). If the user 552 does have too many false positives, then the method 750 may move to the step 782. In the step 782, the user 552 may be charged a small fee (or receive a warning to update the detection settings with no additional fee) for the false positives. Next, the method 750 may return to the step 766.

In the decision step 774, if the emergency event is determined not to be a false positive, the method 750 may move to the step 776. In the step 776, the user 552 may be charged by the system 100 based on a number of good detections (e.g., the emergency alerts 560 that have been verified as actual emergencies). Next, the method 750 may move to the step 778. The step 778 may end the method 750.

In the decision step 764 (shown in association with FIG. 12), if the user 552 has not selected the fee structure based on the microfee per detection, then the method 750 may move to the step 784. For example, a fee structure based on whether the user 552 has manually dismissed the emergency alert 560 may be implemented. The steps 784-794 may be shown in FIG. 12.

In the step 784, the smart security devices 102*a*-102*n* may monitor the area (e.g., one or more of the premises 202*a*-202*n*) while in the automatic on demand mode of operation. Next, the method 750 may move to the decision step 786. In the decision step 786, the processor 112 (or the neural network AI model 132) may determine whether an emergency event has been detected. If no emergency event has been detected, then the method 750 may return to the step 784 (e.g., no charge may be applied to a billing account of the user 552). If an emergency event has been detected, then the method 750 may move to the decision step 788.

In the decision step 788, the app 160 may determine whether the user 552 has responded to the emergency alert 560 within the time limit 530. If the user 552 has responded (e.g., dismissed the emergency alert 560 using the button 570), then the method 750 may move to the step 790. In the step 790, the system 100 may not charge the user 552 (e.g., no charge since the remote monitoring service 210 did not have to intervene). Next, the method 750 may return to the step 784.

In the decision step 788, if the user 552 has not responded to the emergency alert 560 before the time limit counter 568 has expired, then the method 750 may move to the step 792. In the step 792, the system 100 may charge the user 552 for contacting the remote live monitoring service 210. In one example, the user 552 may be charged a flat fee for enabling the automatic on demand backup mode of operation and an additional fee each time the remote live monitoring service 210 intervenes. In another example, the user 552 may only be charged when the remote live monitoring service 210 intervenes. Next, the method 750 may move to the step 794. The step 794 may end the method 750.

Figure 14:
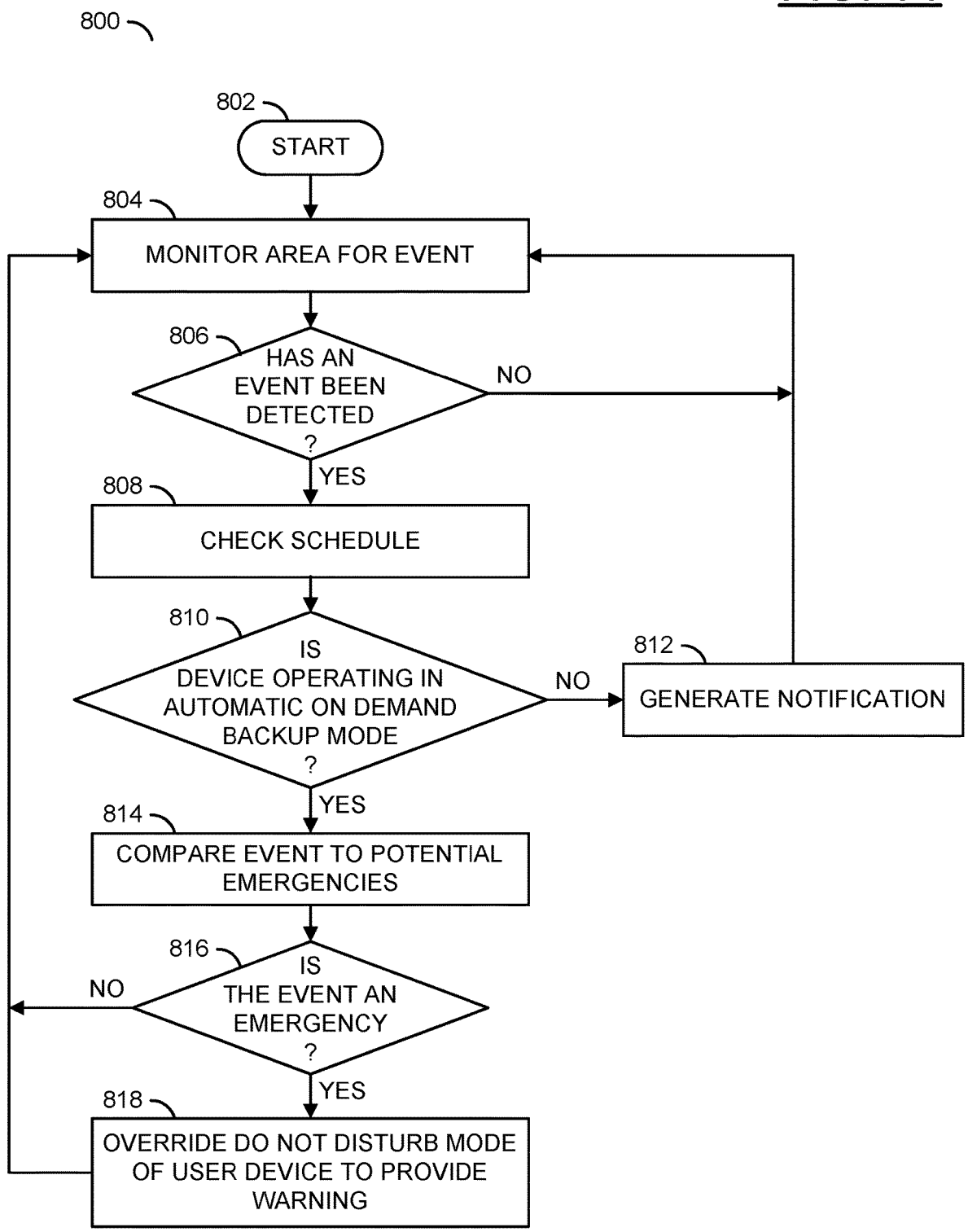
FIG. 14 is as flow diagram illustrating a method for distinguishing between an emergency and a non-emergency event.

Referring to FIG. 14, a method (or process) 800 is shown. The method 800 may distinguish between an emergency and a non-emergency event. The method 800 generally comprises a step (or state) 802, a step (or state) 804, a decision step (or state) 806, a step (or state) 808, a decision step (or state) 810, a step (or state) 812, a step (or state) 814, a decision step (or state) 816, and a step (or state) 818.

The step 802 may start the method 800. In the step 804, the smart security lights 102a-102n may monitor the area (e.g., the field of view 108a) for an event. Next, the method 800 may move to the decision step 806. In the decision step 806, the processor 112 and/or the neural network AI 132 may determine whether an event has been detected (e.g., by analyzing the audio and/or video frames). If no event has been detected, then the method 800 may return to the step 804. If an event has been detected, then the method 800 may move to the step 808. In the step 808, the smart security devices 102a-102n may check the schedule settings (e.g., based on the date ranges 514a-514b and/or the timeslots 522a-522c set on the calendar interface 504). Next, the method 800 may move to the decision step 810. In the decision step 810, the smart security devices 102a-102n may determine whether the automatic on demand backup mode of operation has been enabled. If the automatic on demand mode of operation has not been enabled (e.g., the smart security devices 102a-102n are operating in the default detection mode of operation), then the method 800 may move to the step 812. In the step 812, the communication module 370a may generate a notification. The notification may be displayed by the app 160 and the user 552 may respond to the notification as desired. Next, the method 800 may return to the step 804.

In the decision step 810, if the automatic on demand mode of operation has been enabled, then the method 800 may move to the step 814. In the step 814, the processor 112 and/or the neural network AI model 132 may compare the detected event to predetermined potential emergencies. For example, the types of events that result in the emergency alert 560 may have a higher threshold and/or limited categories compared to events that result in generating the notification while the smart security devices 102a-102n are operating in the default mode of operation. For example, the user 552 may enable the automatic on demand mode of operation only while sleeping and may not want to be disturbed for minor events. In an example, an event may comprise relatively benign events such as movement detected in the video frames, an animal detection, the detection of a child returning home from school, the detection of a solicitor, etc. However, the user 552 may not want to receive the emergency alert 560 for all benign events. In an example, the emergency alert 560 may only be provided for particular categories of events detected (e.g., damage to the home, flooding, fire, a burglar detected, etc.). Generally, the user 552 may receive more notifications and/or broader types of notifications during the default mode of operation compared to the number of instances of the emergency alert 560 during the automatic on demand backup mode of operation. In one example, during the automatic on demand backup mode of operation, notifications for events determined to be benign (e.g., events that may not be on the list of potential emergencies) may be suppressed. In another example, during the automatic on demand backup mode of operation, notifications for events determined to be benign (e.g., events that may not be on the list of potential emergencies) may be stored for later review by the user 552 (e.g., the app 160 may provide a list of unseen events). The types of detections that are determined to be events and/or the types of detections that are considered potential emergencies may be varied according to the design criteria of a particular implementation.

Next, the method 800 may move to the decision step 816. In the decision step 816, the processor 112 and/or the neural network AI model 132 may determine whether the event detect may be categorized as an emergency. If the event is not determined to be an emergency, then the method 800 may return to the step 804. If the event is determined to be an emergency, then the method 800 may move to the step 818. In the step 818, the app 160 may receive the emergency alert from one or more of the smart security devices 102a-102n and override the do not disturb mode 580c of the user devices 106a-106n to provide the warning 564 for the emergency alert 560. Next, the method 800 may return to the step 804.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
   a smart security device configured to (i) capture pixel data of an area, (ii) generate video frames from said pixel data, (iii) capture audio of said area, (iv) perform an analysis of said video frames and said audio, (v) store said video frames and said audio, (vi) detect an event in response to said analysis, (vii) determine whether said event comprises an emergency in response to said analysis, (viii) communicate said video frames and said audio and (ix) communicate a notification in response to said event; and
   a communication device implementing computer readable instructions, said computer readable instructions configured to (i) receive said video frames, said audio and said notification, (ii) display said video frames and said notification and playback said audio and (iii) override a do not disturb mode of said communication device in response to said emergency, wherein
   (a) said do not disturb mode of said communication device is (i) controlled at an operating system level of said communication device and (ii) set by a user independent from said computer readable instructions to suppress all sounds of said communication device, and
   (b) said computer readable instructions (i) enable said sounds to override said do not disturb mode when said notification comprises said emergency when said smart security device operates in an automatic on demand backup mode of operation and (ii) prevent said notification when said notification does not comprise said emergency in said automatic on demand backup mode of operation.

2. The system according to claim 1, wherein
   (A) said notification is generated in response to said event when said smart security device is not in said automatic on demand backup mode of operation,
   (B) said smart security device is further configured to operate in said automatic on demand backup mode of operation for a predetermined amount of time,
   (C) said notification is generated in response to said event comprising said emergency detected during said automatic on demand backup mode of operation,
   (D) a fee structure is applied specific to said automatic on demand backup mode of operation, and
   (E) said fee structure is not applied when said smart security device is not in said automatic on demand backup mode of operation.

3. The system according to claim 2, wherein
   (A) said communication device is further configured to (i) receive a response to said emergency, (ii) communicate with a remote monitoring service, and (iii) communicate said response to said smart security device,
   (B) a time limit is implemented for said user of said communication device to provide said response to said emergency,
   (C) said remote monitoring service is activated if said user does not provide said response to said emergency within said time limit, and
   (D) said fee structure comprises a fee charged if said remote monitoring service is activated.

4. The system according to claim 3, wherein (i) said event is verified by said remote monitoring service to prevent a false positive, and (ii) said fee structure is not applied when said event is said false positive.

5. The system according to claim 3, wherein said fee is charged only if said user does not provide said response to said emergency within said time limit.

6. The system according to claim 3, wherein said remote monitoring service for said smart security device is provided as part of a premium service subscription plan.

7. The system according to claim 3, wherein said remote monitoring service is provided for said smart security device as a free service.

8. The system according to claim 3, wherein (i) if said user does not provide said response to said emergency within said time limit, said remote monitoring service confirms said event is not a false positive and informs a trusted responder to go to said area and (ii) said trusted responder comprises at least one of emergency services and a neighbor.

9. The system according to claim 3, wherein said remote monitoring service is not contacted if said response dismisses said emergency before said time limit.

10. The system according to claim 2, wherein said fee structure comprises a fee charged based on an amount of time selected for said predetermined amount of time for said smart security device to operate in said automatic on demand backup mode of operation.

11. The system according to claim 2, wherein said fee structure comprises a fee charged each time said event is detected during said automatic on demand backup mode of operation.

12. The system according to claim 2, wherein said smart security device and said computer readable instructions are usable by said user without a fee when said smart security device does not operate in said automatic on demand backup mode of operation.

13. The system according to claim 1, wherein said smart security device comprises (i) a custom mounting bracket to enable securing said smart security device to an electrical junction box, (ii) an adapter plate configured to enable a light fixture to be secured to said electrical junction box with said adapter plate, (iii) a power adapter configured to provide AC power to said light fixture and convert said AC power to a DC power source and (iv) a base (a) comprising a circuit configured to receive said DC power source and capture said pixel data and (b) configured to slide in and out of said adapter plate to adjust a distance between said adapter plate and said base.

14. The system according to claim 1, wherein said smart security device comprises a removable storage device configured to store said video frames and said audio for 90 days of 24-hour recording.

15. The system according to claim 1, wherein (i) said event comprises a detection of a person or a vehicle and (ii) said event is said emergency when said analysis determines said event comprises a burglar.

16. The system according to claim 1, wherein (i) said user configures said communication device to enable said emergency to override said do not disturb mode and (ii) said emergency is communicated using a phone call.

17. The system according to claim 1, wherein (i) said user configures said communication device to enable said emergency to override said do not disturb mode and (ii) said emergency is communicated using a series of loud sound alerts.

18. The system according to claim 1, wherein said communication device comprises a smartphone and said computer readable instructions implement an app.

19. The system according to claim 1, wherein (i) said area comprises a residential home, (ii) said communication device comprises a smart home device and (iii) said computer readable instructions implement conversational applications for said smart home device.

* * * * *